United States Patent
Meyer et al.

(10) Patent No.: US 7,835,561 B2
(45) Date of Patent: Nov. 16, 2010

(54) METHOD FOR IMAGE PROCESSING AND RECONSTRUCTION OF IMAGES FOR OPTICAL TOMOGRAPHY

(75) Inventors: Michael G. Meyer, Seattle, WA (US); J. Richard Rahn, Sammamish, WA (US); Mark E. Fauver, Seattle, WA (US)

(73) Assignee: VisionGate, Inc., Gig Harbor, WA (US)

( * ) Notice: Subject to any disclaimer, the term of this patent is extended or adjusted under 35 U.S.C. 154(b) by 851 days.

(21) Appl. No.: 11/750,924

(22) Filed: May 18, 2007

(65) Prior Publication Data

US 2008/0285827 A1 Nov. 20, 2008

(51) Int. Cl.
G06K 9/00 (2006.01)
G01N 21/00 (2006.01)

(52) U.S. Cl. .................. 382/131; 382/274; 356/343
(58) Field of Classification Search .......... 382/128, 382/129, 130, 131, 132, 133, 134, 154, 168, 382/181, 203, 232, 254–260, 263–264, 274–275, 382/276, 285, 294, 305, 312; 378/21; 356/343, 356/73, 419, 244; 359/724
See application file for complete search history.

(56) References Cited

U.S. PATENT DOCUMENTS

| | | | |
|---|---|---|---|
| 3,470,373 A | 9/1969 | Brewer | |
| 3,497,690 A | 2/1970 | Wheeless, Jr. | |
| 3,598,471 A | 8/1971 | Baldwin | |
| 3,657,537 A | 4/1972 | Wheeless, Jr. | |
| 3,748,468 A | 7/1973 | Hartman | |
| 3,833,762 A | 9/1974 | Gudmundsen | |
| 3,960,449 A | 6/1976 | Carlton | |
| 3,999,047 A | 12/1976 | Green | |
| 4,175,860 A | 11/1979 | Baucus | |
| 4,183,623 A | 1/1980 | Haines | |
| 4,200,353 A | 4/1980 | Hoffman | |
| 4,293,221 A | 10/1981 | Kay | |
| 4,360,885 A | 11/1982 | Edgar | |
| 4,702,598 A * | 10/1987 | Bohmer | ........... 356/343 |
| 4,714,345 A | 12/1987 | Schrader | |
| 4,858,128 A | 8/1989 | Nowak | |
| 4,873,653 A | 10/1989 | Grosskopf | |
| 4,891,829 A | 1/1990 | Deckman | |
| 5,141,609 A | 8/1992 | Sweedler | |
| 5,148,502 A | 9/1992 | Tsujiuchi | |
| 5,281,517 A | 1/1994 | Bacus | |
| 5,308,990 A | 5/1994 | Takahashi | |

(Continued)

FOREIGN PATENT DOCUMENTS

JP    02085747 A    3/1990

(Continued)

OTHER PUBLICATIONS

Pieper, R.J. and Korpel A., Image processing for extended depth of field, Applied Optics, vol. 22, No. 10, May 15, pp. 1449-1453, 1983.

(Continued)

*Primary Examiner*—Seyed Azarian
(74) *Attorney, Agent, or Firm*—Citadel Patent Law; George A Leone

(57) ABSTRACT

A method for reconstructing three-dimensional (3D) tomographic images. A set of pseudo-projection images of an object is acquired. Error corrections are applied to the set of pseudo-projection images to produce a set of corrected pseudo-projection images. The set of corrected pseudo-projection images are processed to produce (3D) tomographic images.

57 Claims, 19 Drawing Sheets

U.S. PATENT DOCUMENTS

| | | | |
|---|---|---|---|
| 5,312,535 A | 5/1994 | Waska | |
| 5,321,501 A | 6/1994 | Swanson | |
| 5,333,164 A | 7/1994 | Tam | |
| 5,390,226 A | 2/1995 | Tam | |
| 5,402,460 A | 3/1995 | Johnson | |
| 5,428,447 A | 6/1995 | Toida | |
| 5,539,800 A | 7/1996 | Katsevich | |
| 5,548,395 A | 8/1996 | Kosaka | |
| 5,552,605 A | 9/1996 | Arata | |
| 5,644,388 A * | 7/1997 | Maekawa et al. | 356/73 |
| 5,668,887 A | 9/1997 | Parker | |
| 5,673,300 A | 9/1997 | Reckwerdt | |
| 5,680,484 A | 10/1997 | Ohyama | |
| 5,710,429 A | 1/1998 | Alfano | |
| 5,741,411 A | 4/1998 | Yeung | |
| 5,760,901 A | 6/1998 | Hill | |
| 5,760,951 A | 6/1998 | Dixon | |
| 5,828,408 A | 10/1998 | Mottin | |
| 5,831,723 A * | 11/1998 | Kubota et al. | 356/73 |
| 5,848,123 A | 12/1998 | Strommer | |
| 5,878,103 A | 3/1999 | Sauer | |
| 5,880,838 A | 3/1999 | Marx | |
| 5,909,476 A | 6/1999 | Cheng | |
| 5,915,048 A | 6/1999 | Hill | |
| 5,987,158 A | 11/1999 | Meyer | |
| 6,005,617 A | 12/1999 | Shimamoto | |
| 6,026,174 A | 2/2000 | Palcic | |
| 6,037,579 A | 3/2000 | Chan et al. | |
| 6,038,067 A | 3/2000 | George | |
| 6,047,080 A | 4/2000 | Chen | |
| 6,072,624 A | 6/2000 | Dixon | |
| 6,078,681 A | 6/2000 | Silver | |
| 6,091,983 A | 7/2000 | Alfano | |
| 6,130,958 A | 10/2000 | Rohler | |
| 6,165,734 A | 12/2000 | Garini | |
| 6,192,144 B1 | 2/2001 | Holz | |
| 6,201,628 B1 | 3/2001 | Basiji | |
| 6,211,955 B1 | 4/2001 | Basiji | |
| 6,215,587 B1 | 4/2001 | Alfano | |
| 6,239,871 B1 | 5/2001 | Gilby | |
| 6,248,988 B1 | 6/2001 | Krantz | |
| 6,249,341 B1 | 6/2001 | Basiji | |
| 6,251,586 B1 | 6/2001 | Mulshine | |
| 6,251,615 B1 | 6/2001 | Oberhardt | |
| 6,252,979 B1 | 6/2001 | Lee | |
| 6,291,824 B1 | 9/2001 | Battarbee | |
| 6,312,914 B1 | 11/2001 | Kardos | |
| 6,388,809 B1 | 5/2002 | MacAulay | |
| 6,452,179 B1 | 9/2002 | Coates | |
| 6,473,176 B2 | 10/2002 | Basiji | |
| 6,519,355 B2 | 2/2003 | Nelson | |
| 6,522,775 B2 | 2/2003 | Nelson | |
| 6,529,614 B1 | 3/2003 | Chao | |
| 6,540,895 B1 | 4/2003 | Spence et al. | |
| 6,591,003 B2 | 7/2003 | Chu | |
| 6,608,682 B2 * | 8/2003 | Ortyn et al. | 356/419 |
| 6,636,623 B2 | 10/2003 | Nelson | |
| 6,640,014 B1 | 10/2003 | Price | |
| 6,697,508 B2 | 2/2004 | Nelson | |
| 6,741,730 B2 | 5/2004 | Rahn | |
| 6,770,893 B2 | 8/2004 | Nelson | |
| 6,775,399 B1 | 8/2004 | Jiang | |
| 6,842,297 B2 * | 1/2005 | Dowski, Jr. | 359/724 |
| 6,850,587 B1 | 2/2005 | Karimi | |
| 6,868,177 B1 | 3/2005 | Sitton et al. | |
| 6,944,322 B2 | 9/2005 | Johnson | |
| 6,975,400 B2 * | 12/2005 | Ortyn et al. | 356/419 |
| 6,991,738 B1 | 1/2006 | Fauver | |
| 7,003,143 B1 | 2/2006 | Hewitt | |
| 7,197,355 B2 | 3/2007 | Nelson | |
| 7,218,393 B2 * | 5/2007 | Sharpe et al. | 356/244 |
| 7,224,540 B2 | 5/2007 | Olmstead et al. | |
| 7,260,253 B2 | 8/2007 | Rahn | |
| 7,274,809 B2 | 9/2007 | MacAulay et al. | |
| 2001/0012069 A1 | 8/2001 | Derndinger | |
| 2002/0122167 A1 | 9/2002 | Riley et al. | |
| 2002/0161534 A1 | 10/2002 | Adler | |
| 2003/0063384 A1 | 4/2003 | Dowski, Jr. | |
| 2003/0199758 A1 | 10/2003 | Nelson | |
| 2003/0222197 A1 | 12/2003 | Reese | |
| 2003/0235840 A1 | 12/2003 | Ward et al. | |
| 2004/0001618 A1 | 1/2004 | Johnson | |
| 2004/0008515 A1 | 1/2004 | Brown | |
| 2004/0076319 A1 | 4/2004 | Fauver | |
| 2004/0228520 A1 | 11/2004 | Dresser et al. | |
| 2005/0006595 A1 | 1/2005 | Goodwin | |
| 2005/0010108 A1 | 1/2005 | Rahn et al. | |
| 2005/0085708 A1 | 4/2005 | Fauver | |
| 2005/0085721 A1 | 4/2005 | Fauver | |
| 2006/0023219 A1 | 2/2006 | Meyer | |
| 2006/0066837 A1 | 3/2006 | Ortyn et al. | |
| 2006/0068371 A1 | 3/2006 | Ortyn et al. | |
| 2006/0093200 A1 | 5/2006 | Sharpe et al. | |
| 2006/0096358 A1 | 5/2006 | Fauver | |
| 2006/0099707 A1 | 5/2006 | Nelson | |
| 2006/0183220 A1 | 8/2006 | Nelson | |
| 2007/0036418 A1 | 2/2007 | Pan et al. | |
| 2007/0071357 A1 | 3/2007 | Rahn | |
| 2007/0146873 A1 | 6/2007 | Ortyn et al. | |
| 2007/0215528 A1 | 9/2007 | Hayenga | |
| 2007/0258122 A1 | 11/2007 | Chamgoulov et al. | |

FOREIGN PATENT DOCUMENTS

| | | |
|---|---|---|
| JP | 10260131 A | 9/1998 |
| JP | 2000121550 A | 4/2000 |
| WO | WO0111341 A2 | 2/2002 |
| WO | WO0218537 A2 | 3/2002 |
| WO | WO0235474 A1 | 5/2002 |
| WO | WO02095476 A2 | 11/2002 |

OTHER PUBLICATIONS

Bradburn S. et al., Realizations of Focus Invariance in Optical/Digital Systems with Wavefront Coding, Applied Optics, vol. 36, Issue 35, pp. 9157-9166, 1997.

Sheppard, C. J. R. & Torok, P., Effects of specimen refractive index on confocal imaging, Journal of Microscopy, vol. 185, Pt. 3, Mar. 1997, pp. 366-374.

Tucker, S.C. et al., Extended depth of field and aberration control for inexpensive digital microscope systems, Optics Express, vol. 4, No. 11, May 24, pp. 467-474, 1999.

Edelmann, P. et al., Correlation of chromatic shifts and focal depth in Spectral Precision Distance Microscopy measured by Micro Axial Tomography, Optical Biopsies and Microscopic Techniques III, Sep. 1999, SPIE vol. 3568, pp. 89-95.

Widjanarko, T., et al., A post-processing technique for extending depth of focus in conventional optical microscopy, Optics & Laser Technology 34, pp. 299-305, 2002.

Martini, N. et al., A new high-aperture glycerol immersion objective lens and its application to 3D-fluoresence microscopy, Journal of Microscopy vol. 206 Pt. 2, May 2002, pp. 146-151, 2002.

Lane, P.M. et al., Confocal Microendoscopy with Chromatic Sectioning, Spectral Imaging: Instrumentation, Applications, and Analysis II, Proc. of SPIE vol. 4959 pp. 23-26, 2003.

Fauver et al., "Three-dimensional imaging of single isolated cell nuclei using optical projection tomography," Optics Express, May 30, 2005/vol. 13 No. 11/4210-4223.

Fauver et al.,"Development of Micro-Optical Projection Tomography for 3D Analysis of Single Cells," Image Acquisition and Processing XI. Edited by Conchello, Jose-Angel; Cogswell, Carol J.; Wilson, Tony. Proceedings of the SPIE, vol. 5324, pp. 171-181 (2004).

Kikuchi, S. et al., "Three-dimensional computed tomography for optical microscopes," Optics Communications 107 (1994) 432-444.

Kikuchi, S. et al., "Three-dimensional microscope computed tomography based on general Radon transform for optical imaging systems," Optics Communications 123 (1996) 725-733.

Matula, P. et al. "Precise 3D image alignment in micro-axial tomography," Journal of Microscopy, vol. 209, Pt. 2 (Feb. 2003) pp. 126-142.

Ong, SH, Development of an imaging flow cytometer. Anal Quant Cytol Histol 9(5)pp. 375-382, 1987.

Gilbert, P, "Iterative Methods for the Three dimensional Reconstruction of an Object from Projections," Journal of Theoretical Biology 36pp. 105-117, 1972.

Oppenheim, BE, More Accurate Algorithms for Iterative 3 dimensional Reconstruction, IEEE Transactions on Nuclear Science NS-21pp. 72-77, 1974.

Singer, JR, Grunbaum, FA, Kohn, P, and Zubelli, JP, "Image Reconstruction of the Interior of Bodies that Diffuse Radiation," Science 248(4958)pp. 990-993, 1990.

Mueller, K and Yage, R, "Rapid 3-D Cone-beam Reconstruction with the Simultaneous Algebraic Reconstruction Technique (SART) Using 2-D Texture Mapping Hardware", IEEE Transactions on Medical imaging 19(12)pp. 1227-1237, 2001.

Bellman, SH, Bender, R, Gordon, R, and Rowe, JE, "ART is Science being A Defense of Algebraic Reconstruction Techniques for Three dimensional Electron Microscopy," Journal of Theoretical Biology 32pp. 205-216, 1971.

Manglos,SH, Jaszcak, RJ, and Floyd, CE, "Maximum Likelihood Reconstruction for Cone Beam SPECT: Development and Initial Tests," Physics in Medicine and Biology 34(12)pp. 1947-1957,1989, #1382.

Manglos,SH, Gagne, GM, Krol A. Thomas, FD, and Narayanaswamy, R, "Transmission Maximum-likelihood Reconstruction with Ordered Subsets for Cone Beam CT", Physics in Medicine and Biology 40(7)pp. 1225-1241, 1995, #4389.

Hampel, U and Freyer, R, "Fast Image Reconstruction for Optical Absorption Tomography in Media with Radially Symmetric Boundaries", Medical Physics 25 (1)pp. 92-101, 1998.

Jiang, H, Paulsen, KD, and Osterberg, UL, "Frequency-domain Near-infrared Photo Diffusion Imaging: Initial Evaluation in Multitarget Tissuelike Phantoms", Medical Physics 25(2)pp. 183-193,1998.

Herman, G, Image Reconstruction from Projections: The Fundamentals of Computerized Tomography, Academic Press, New York, 1980.

Paulsen, KD and Jiang, H, "Spatially Varying Optical Property Reconstruction Using a Finite Element Diffusion Equation Approximation", Medical Physics 22(691-701) 1995.

Farichild Imaging, Preliminary Data Sheet CCD525, TDI, Time Delay and Integration Sensor, Jan. 12, 2001.

Farichild Imaging, Preliminary Data Sheet CCD582, TDI, Time Delay and Integration Sensor, Jan. 18, 2000.

Shapiro, HM, Practical Flow Cytometry, 3rd ed., Wiley-Liss, 1995.

HJ Tiziani, and MI Uhde, Three-dimensional analysis by a microlens array confocal arrangements (Applied Optics 33, 567 [1994]).

Bayat, S, Le Duc, G, Porra, L, Berrruyer, G, Nemoz, C, Monfraix, S, Fiedler, S. Thomlinson, W, Suortti, P, Standertskjold-Nordenstam, CG, and Soyijarvi, Ara, "Quantitative Functional Lung Imaging with Synchrotron Radiation Using Inhaled Xenon as Contrast Agent", Physics in Medicine and Biology 46(3287-99) 2001.

Bentley, MD, Ortiz, MC, Ritman, EL, and Romero, JC. "The Use of Microcomputed Tomography to Study Microvasculature in Small Rodents", American Journal of Physiology (Regulatory Integrative Comp Physiol) 282 (R1267-R1279) 2002.

Cheng, PC, Lin, TH, Wang, G, Shinozaki, DM, Kim, HG, and Newberry, SP, "Review on the Development of Cone-beam X-ray Microtomography", Proceedings of the X-ray Optics and Microanalysis 1992, Institute of Physics Ser. No. 130, Kenway, PB, et al. (eds.), Manchester, UK, Aug. 31-Sep. 4, 1992, pp. 559-566.

Defrise, M, Clack, R, and Townsend, DW, "Image Reconstruction from Truncated, Two-dimensional, Parallel Projections", Inverse Problems 11(287-313) 1995.

Defrise, M, Noo, F, and Kudo, H, "A Solution to the Long-object Problem in Helical Cone-beam Tomography", Physics in Medicine and Biology 45(623-43) 2000.

Endo, M, Tsunoo, T, Nakamori, N, and Yoshida, K, "Effect of Scattered Radiation on Image Noise in Cone Beam CT", Medical Physics 28(4) (469-74) 2001.

Jorgensen, SM, Demirkaya, O, and Ritman, EL, "Three Dimensional Imaging of Vasculature and Parenchyma in Intact Rodent Organs with X-ray Micro-CT", Am. J. Physiology 275(Heart Circ. Physiol. 44) pp. H1103-H1114, 1998.

Kinney,JH, Johnson, QC, Saroyan, RA, Nichols, MC, Bonse, U, Nusshardt, R, and Pahl, R, "Energy-modulated X-ray Microtomography", Rev. Sci. Instrum, 59(1)pp. 196-197, 1988.

Kinney,JH, and Nichols, MC, "X-ray Tomographic Microscopy (XTM) Using Synchrotron Ratiation", Annu. Rev. Mater. Sci. 22pp. 121-152, 1992.

Taguchi, K and Aradate, H, "Algorithm for Image Reconstruction in Multi-slice Helical CT", Medical Physics 25(4) pp. 550-561, 1998.

Yu, DF, Fessler, JA, and Ficaro, EP, "Maximum-Likelihood Transmission Image Reconstruction for Overlapping Transmission Beams", IEEE Transactions on Medical Imaging 19(11)pp. 1094-1105, 2000.

Sharpe, J, Ahlgren, U et al., "Optical Projection Tomography as a Tool for 3D Microscopy and Gene Expression Studies," Science, vol. 296, pp. 541-545, Apr. 19, 2002.

Sharpe, J, review, "Optical Projection Tomography as a New Tool for Studying Embryo Anatomy," J. Anat. (2003), pp. 175-181.

RH Anderson, "Close-up imaging of documents and displays with lens arrays," AppliedOptics 18, 477 (1979).

A. Klug and J.L. Finch, "Structure of viruses of the papillomapolyoma type," J. Mol. Biol., vol. 37, p. 1 (1968).

A. Klug, "Image analysis and reconstruction in the electron microscopy of biological macromolecules," Chem. Scripta, vol. 14, p. 245 (1978).

T.C. Wedberg and J.J. Stamnes, "Recent results in optical diffraction microtomography," Meas. Sci. Technol., vol. 7, p. 414 (1996).

Y. Li, et al., "Comparison of analog and digital Fourier transforms in medical image analysis," J. Biomed. Optics, vol. 7, p. 255 (2002).

Y. Xu et al., "Three-dimensional diffuse optical tomography of bones and joints," J. Biomed. Optics, vol. 7, p. 88 (2002).

H. Banda-Gamboa et al., "Spectral-Analysis of Cervical Cells Using the Discrete Fourier-Transform," Anal. Cell. Path., vol. 5(2), pp. 85-102 (1993).

D.E. Burger, et al., "Extraction of Morphilogical Features from Biological Models and Cells by Fourier Analysis of Static Light Scatter Measurements," Cytometry, vol. 2, No. 5, pp. 327-336 (1982).

M. Rozycka, et al., "Optical Diffraction as a Tool for Semiautomatic, Quantitative Analysis of Tissue Specimens," Cytometry, vol. 2, No. 4, pp. 244-248 (1982).

Almeida and Fuji, Fourier transform differences and averaged simularities in diatoms, Applied Optics, vol. 18, No. 10, pp. 1663-1667, (1979).

Smolinska and Dawidowicz, "Extraction of common or different part from optical images," Institute of Physics, Warsaw Technical University, 222-223.

Pawley, JB, Handbook of Biological Confocal Microscopy, Plenum Press, NY 479-490 (1995).

Kak, A.C. and Staney, M., Principles of Computerized Tomographic Imaging, IEEE Press, New York, 1988, and Herman, G., Image Reconstruction from Projections: The Fundamentals of Computerized Tomography, Academic Press, New York, 1980).

E.G. Steward, Fourier Optics: An Introduction, 2nd ed. (Halsted Press, New York, 1987).

Ostrowski, et al., "Application of Optical Diffractomery in Studies of Cell Fine Structure," Histochemistry (1983) 78:435-449.

George, JS et al., "Virtual Pinhole Confocal Microscope," Physics Division Progress Report, www.lanl.gov/p/pdfs/papp_pinhole.pdf, (1999-2000).

W.H. Press et al., Numerical Recipes in C (New York: Cambridge University Press, 1988).

* cited by examiner

METHOD FOR IMAGE PROCESSING AND RECONSTRUCTION OF IMAGES FOR OPTICAL TOMOGRAPHY

TECHNICAL FIELD

The present invention relates to optical tomographic imaging systems in general and, more particularly, to optical tomography where an image of a small object, such as, for example, a biological cell, is processed and reconstructed using a three-dimensional algorithm.

BACKGROUND

Recent advances in imaging biological cells using optical tomography have been developed by Nelson as disclosed, for example, in U.S. Pat. No. 8,522,775, issued Feb. 18, 2003, and entitled "APPARATUS AND METHOD FOR IMAGING SMALL OBJECTS IN A FLOW STREAM USING OPTICAL TOMOGRAPHY," the full disclosure of which is incorporated by reference. Further development in the field is taught in Fauver et al., U.S. patent application Ser. No. 10/716,744, filed Nov. 18, 2003 and published as US Publication No. US-2004-0076319-A1 on Apr. 22, 2004, entitled "METHOD AND APPARATUS OF SHADOWGRAM FORMATION FOR OPTICAL TOMOGRAPHY," the full disclosure of which is also incorporated by reference.

Processing in such an optical tomography system begins with specimen preparation. Typically, specimens taken from a patient are received from a hospital or clinic and processed to remove non-diagnostic elements, fixed and then stained. Stained specimens are mixed with an optical gel and inserted into a microcapillary tube. Images of objects in the specimen, such as cells, are produced using an optical tomography system. When acquired using extended depth of field optical techniques, the resultant projection images may comprise a set of extended depth of field images from differing perspectives called "pseudo-projection images."

The set of projection images can be reconstructed using backprojection and filtering techniques to yield a reconstructed 3D image of a cell of interest. The most common and easily implemented reconstruction algorithms, known as filtered backprojection methods, are derived from a similar algorithm in x-ray computed tomography (CT) using parallel-beam geometry. (See the following references, for example, Kak, A. C. and Slaney, M., *Principles of Computerized Tomographic Imaging*, IEEE Press, New York, 1988, and Herman, G., *Image Reconstruction from Projections: The Fundamentals of Computerized Tomography*, Academic Press, New York, 1980). These methods are based on theorems for Radon transforms with modifications that reflect the particular geometry of the source/detector configuration and the ray paths in the irradiating beam.

Unfortunately, known techniques do not adequately address several error mechanisms that may be introduced during the acquisition of projection images, including pseudo-projection images. Such acquisition errors may adversely affect post acquisition reconstruction of multi-dimensional images. Errors may be introduced, for example, by mechanical misalignments causing centering errors, by light transmission effects described by Beer's law, by characteristics of optical transfer functions inherent in a set of optics, and by distortions caused by undesirable lens effects at material interfaces such as tube walls.

Adequate solutions to the above-identified error mechanisms are lacking. Further, known techniques for developing filters lack a method for developing optimized filters for backprojection of pseudo-projection images. As a result there is a need for systems and methods for mitigating such errors and their resultant adverse effects and for developing optimized filters.

DETAILED DESCRIPTION OF THE PREFERRED EMBODIMENTS

Figure 1A:
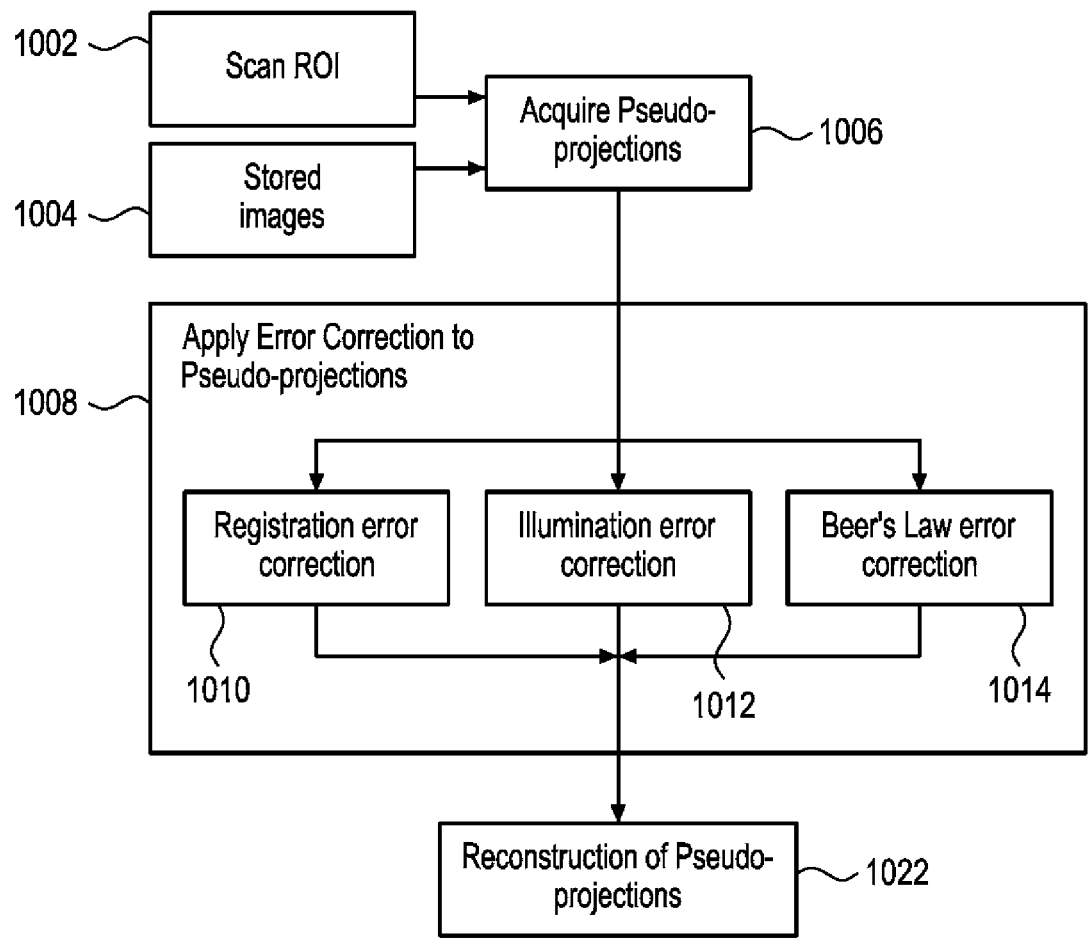
FIG. 1A schematically shows a high level block diagram of an example embodiment for three dimensional reconstruction of a set of pseudo-projections.

The following disclosure describes several embodiments and systems for processing images including, for example, error correction and reconstruction of three-dimensional images. Several features of methods and systems in accordance with embodiments of the invention are set forth and described in FIGS. 1A-15. It will be appreciated that methods and systems in accordance with other example embodiments of the invention can include additional procedures or features different than those shown in FIGS. 1A-15. Additionally, methods and systems in accordance with several example embodiments of the invention may not include all of the features shown in these Figures. Throughout the Figures, like reference numbers refer to similar or identical components or procedures.

The detailed description herein is made with respect to specific examples relating to objects of interest, such as, for example, biological cells, however, it will be understood that these examples are for the purpose of illustration, and not limitation, in one example, an object such as a biological cell may be labeled with at least one stain, protein or tagged molecular probe, and the measured amount and location of this probe may yield important information about the disease state of the cell, including, but not limited to, various cancers such as lung, breast, prostate, cervical and ovarian cancers.

In accordance with the method of an example embodiment, image processing is undertaken to render the pseudo-projection images more suitable as inputs to, for example, backprojection and filtering algorithms used for reconstructing three-dimensional images from the pseudo-projection images. Reconstruction follows image processing and yields a reconstructed 3D image of an object being imaged. There are typically two parts to a reconstruction algorithm: backprojection and filtering. Backprojection is the technique whereby corrected and processed pseudo-projection images are projected into a reconstruction space and intersected with each other. Filtering typically precedes backprojection and reduces artifacts arising from backprojection techniques. While some techniques for backprojection and filtering are known, methods presented here provide novel improvements for use in reconstruction of 3D tomographic images as described and claimed herein.

Generally as used herein the following terms have the following meanings when used within the context of optical microscopy processes:

"Capillary tube" has its generally accepted meaning and is intended to include microcapillary lubes and equivalent items with an inside diameter of 100 microns or less. Such microcapillary tubes are manufactured by Polymicro Technologies, LLC, AZ.

"Object" means an individual cell or other entity. One or more objects may comprise a specimen.

"Pseudo-projection" (herein often abbreviated "PP") includes a single image representing a sampled volume of extent larger than the native depth-of-field of the optics.

"Specimen" means a complete product obtained from a single test or procedure from an individual patient (e.g., sputum submitted for analysis, a biopsy, or a nasal swab.) A specimen may be composed of one or more objects. The result of the specimen diagnosis becomes part of the case diagnosis.

"Sample" means a finished cellular preparation that is ready for analysis, including a set of or part of an aliquot or specimen.

"Volume of reconstruction" means the region of space that can be sampled by backprojecting each acquired image. For a parallel-beam reconstruction, this volume takes the form of a solid cylinder, the height of which is equal to the length of the field of view parallel to the rotation axis, and the diameter of which is equal to the length of the field of view perpendicular to the rotation axis.

"Point spread function" or "PSF" means the image of a point within a specimen, as observed by an optical detection system after the optical signal has undergone distortions due to optical inhomogeneities within the specimen as well as due to distortions caused by the optical defection system.

Referring now to FIG. 1A a high level block diagram of an example embodiment for three dimensional reconstruction of a set of pseudo-projections is schematically shown. A plurality of pseudo-projections is acquired at block 1006. The plurality of pseudo-projections may be acquired through optically scanning a region of interest (ROI) 1002 of a sample or supplied as stored images indicated at block 1004. Having acquired the plurality of pseudo-projections, in this example, error correction techniques are applied to the plurality of pseudo-projections at block 1008. The error correction techniques may advantageously include one or more of methods including, for example, registration error correction 1010, illumination error correction 1012 and Beer's law error correction 1014 so as to produce a plurality of error-corrected pseudo-projections and equivalents. Other error correction techniques are available as discussed herein. The plurality of error-corrected pseudo-projections is then reconstructed as indicated at block 1022.

Figure 1B:
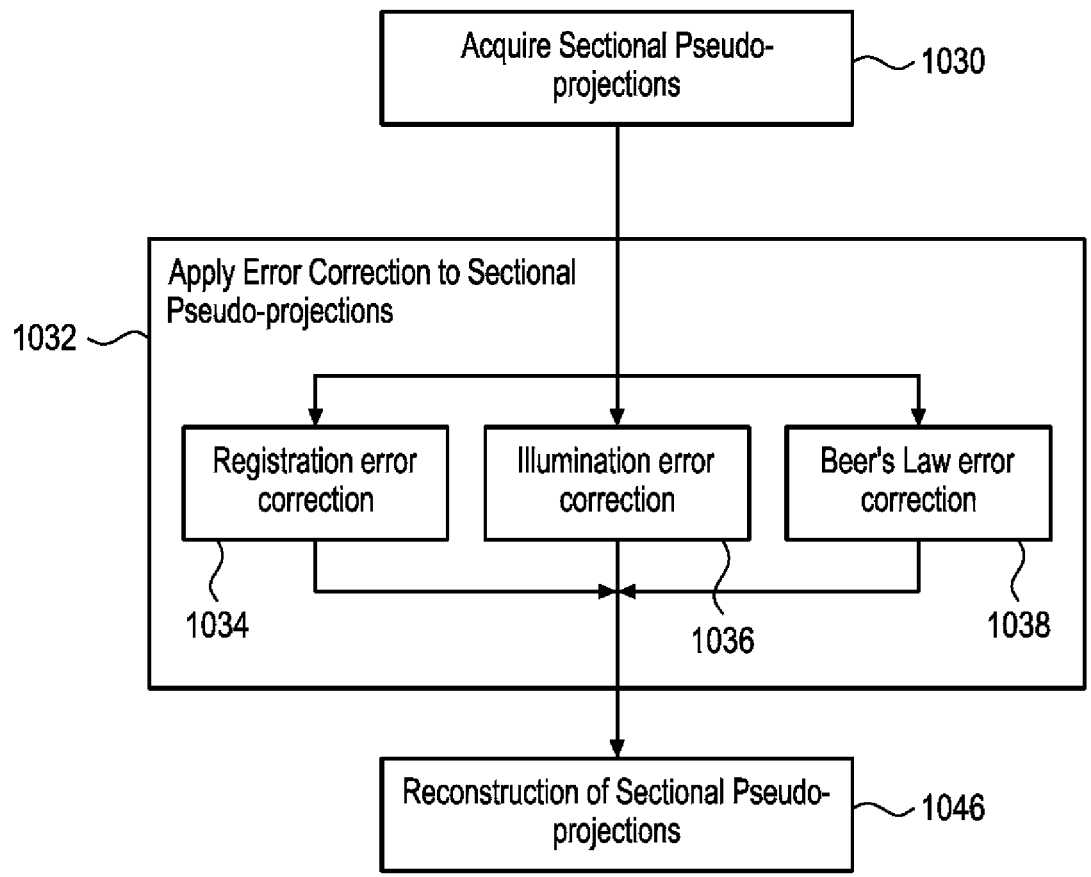
FIG. 1B schematically shows a high level block diagram of an alternate example embodiment for three dimensional reconstruction of a set of sectional pseudo-projections.

Referring now to FIG. 1B a high level block diagram of an alternate example embodiment for three dimensional reconstruction of a set of sectional pseudo-projections is schematically shown. A plurality of sectional pseudo-projections is acquired at block 1030. The plurality of sectional pseudo-projections may be acquired as described herein below. Having acquired the plurality of sectional pseudo-projections, in this example, error correction techniques are applied to the plurality of pseudo-projections at block 1032. If applied, the error correction techniques may advantageously include one or more of methods including, for example, registration error correction 1034, illumination error correction 1038 and Beer's law error correction 1038 and equivalents. Other error correction techniques are available as discussed herein. In one example, error correction is employed to produce a plurality of error-corrected sectional pseudo-projections or may be similarly used to produce a plurality of error-corrected sectional reconstructions. The plurality of error-corrected sectional pseudo-projections is reconstructed as indicated at block 1046.

Note that there are alternate methods for reconstructing sectional PP's, in one example sectional PP's are filtered, added together after filtering, and then reconstructed. In an alternate method sectional PP's are filtered, separately reconstructed as sectional PP's, then added together.

Figure 1C:
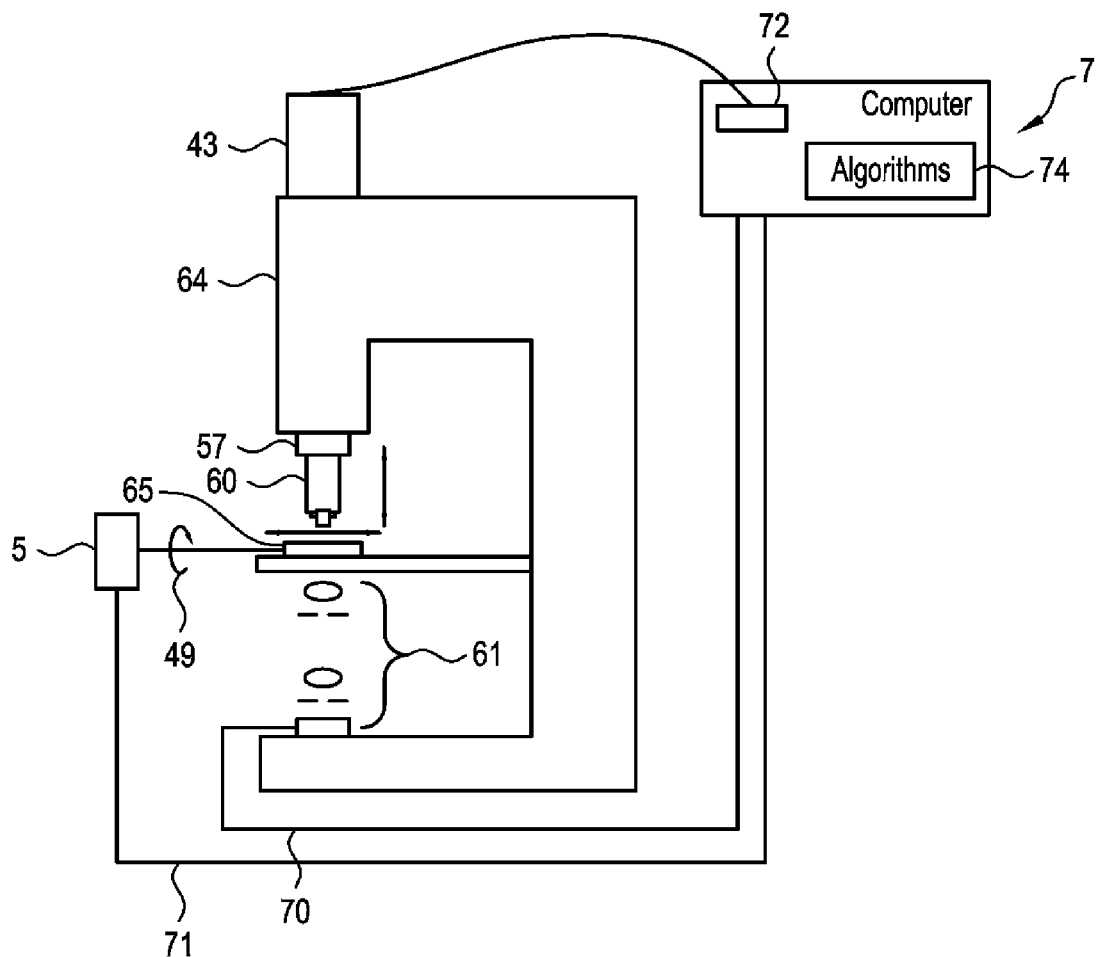
FIG. 1C schematically shows an optical projection tomography microscope system for acquiring pseudo-projections of objects of interest.

Referring now to FIG. 1C an optical projection tomography microscope system for acquiring pseudo-projections of objects of interest is schematically shown. In this example embodiment, a high numerical aperture objective lens 60 may advantageously be mounted on a conventional optical transillumination (bright-field) microscope 64 with a camera 43 attached. The microscopy system also includes a computer-controlled light source and condenser lens assembly 61. The camera 43 may comprise for example, a CCD camera. A piezoelectric transducer (PZT) 57 or equivalent is used to move the objective lens 60 an axial distance of about ten to fifty microns. Computer control signals 70 are linked to the computer-controlled condenser and light source 61 for controlling light modulation. One example of an optical projection tomography microscope is taught in Fauver, et al. as referenced herein above.

Figure 1D:
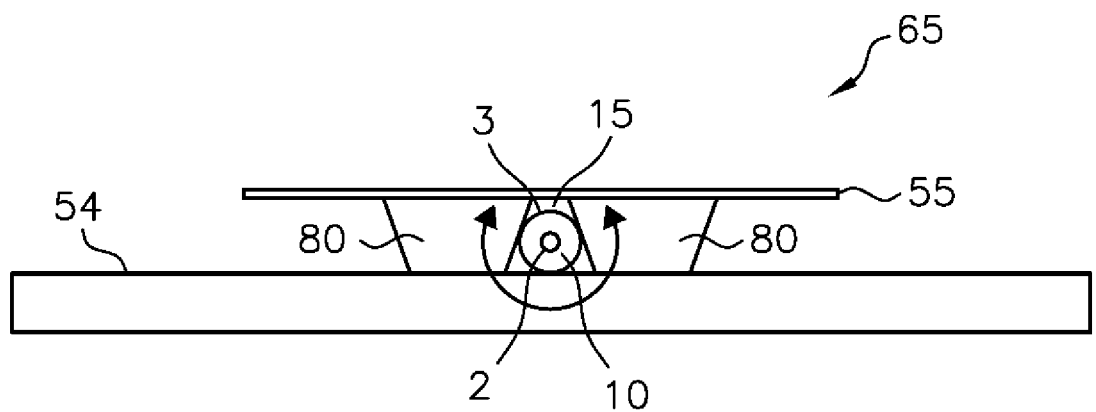
FIG. 1D schematically shows an example illustration of a capillary tube mounted onto a set of polymer grippers.

Camera 43 generates image data that is stored in a computer memory 72. A specimen 2 in a capillary tube 3 (both as shown in FIG. 1D) can be translated along a longitudinal axis 49 within the specimen assembly 65. In addition, the capillary tube 3 containing the specimen can be rotated about the longitudinal axis 49, via a rotational motor 5 that may advantageously be computer-controlled. In an example embodiment the rotational motor 5 is controlled by control signals 71 as provided by the computer 7. For high-speed applications other controls may be added in order to reduce vibrations during an axial scan. Computer algorithms 74 for image acquisition, image processing, including error correction and filtering, and reconstruction of three-dimensional images may advantageously be included in the computer or otherwise configured to receive information from the camera or computer memory.

Referring now to FIG. 1D, an example illustration of a microcapillary tube mounted onto a set of polymer grippers is schematically shown. One example of a polymer gripper system is described in co-pending application Ser. No. 10/975,162 by Fauver, et al. "Optical Projection Tomography Microscope," published on Apr. 21, 2005 as US publication No. 20050085708, which is incorporated by reference. The specimen assembly 65 comprises a microscope slide 54, which serves as an optically clear substrate, capillary tube 3, index matching material 15, a cover slip 55 and a gripping apparatus comprising at least one pair of opposing pillars 80. The capillary tube 3 in one example comprises a capillary tube having a diameter where the field of view for electronic microscopic imaging is comparable to the capillary tube diameter. The capillary tube 3 preferably comprises, for example, a microcapillary tube with inner and outer radii of approximately 50 and 150 microns respectively, inserted into at least one pair of opposing polymer grippers 80. The polymer grippers 80 may advantageously comprise at least one pair of opposing pillars fabricated on a suitable glass substrate such as the microscope slide 54. The capillary tube 3 is filled with an optical gel 10 containing a specimen 2 in the optical gel 10. Immersing the capillary tube 3 in an index matching material 15 provides lubrication during rotation about the longitudinal axis 49 (as shown in FIG. 1C) and provides a uniform medium between the microcapillary tube and the cover slips 55, thus reducing optical aberrations.

The index matching material 15 is selected to allow the optical characteristics of the medium to remain substantially constant, even as the perspective presented to the objective 60 is varied. The index matching material 15 may advantageously be chosen to match the refractive index of the capillary tube 3. Index matching materials are commercially available (e.g., Nye Optical Gels, Dymax Corp, and Cargiile Labs) and include, for example optical gels, oils and fluids of various indices of refraction for reducing light reflection at optical interfaces. Optical gels are particularly useful where higher viscosity is desired and may comprise a medium of oil, gel, polymer epoxy, or other optically transparent materials selected to match refractive indices of the surroundings. Specimens can be held in index-matching epoxy, embedding media, or plastic polymer as well as index-matching gels and viscous fluids.

Center of Mass Method for Correcting Alignment Errors

Figure 2:
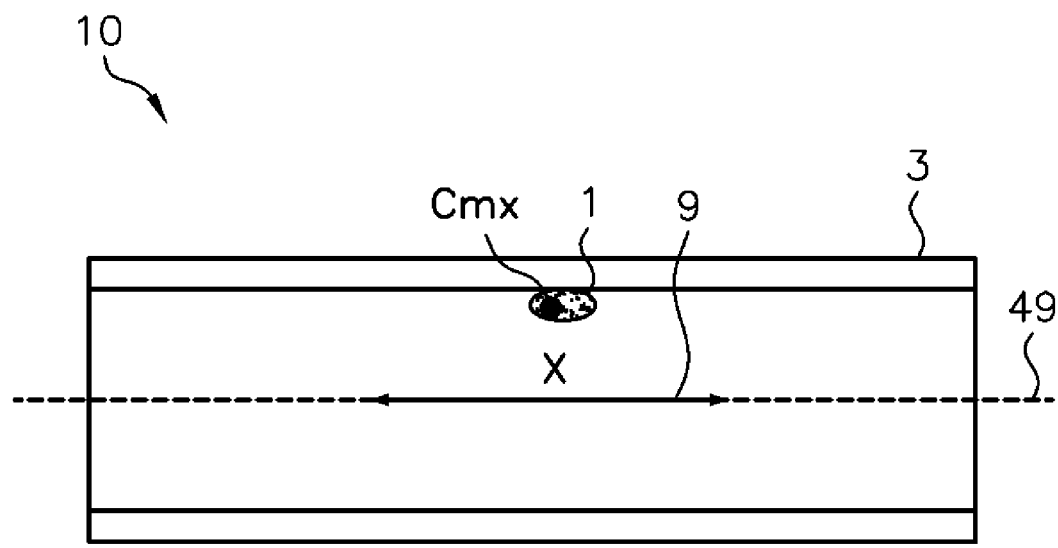
FIG. 2 schematically shows an example illustration of a capillary tube containing an object exhibiting drift parallel to the tube axis.

Referring now to FIG. 2 an example illustration of an object in a capillary tube exhibiting axial drift is shown. An object, such as a cell 1 is held in a capillary tube 3, filled with an optical gel 10. Typically the cell drifts longitudinally along the longitudinal axis 49 of the capillary tube 3 due to instability in the optical gel 10 as indicated by double arrow 9. The cell 1 should be aligned to a common center in a set of pseudo-projection images if reconstruction is to be successful; therefore it is advantageous to compensate for axial drift of the object prior to reconstruction of an image.

For the cell 1, shown at an axial position x in the capillary tube 3, a plurality of pseudo-projection images is acquired at various angular rotation values around axial position x. Due to axial drift, the object is placed at differing positions along the longitudinal axis of the tube during acquisition of the plurality of pseudo-projection images. For each position the center of mass of the cell $C_{mx}$, is measured and the component of the center of mass along the longitudinal axis 49 is found.

Figure 2A:
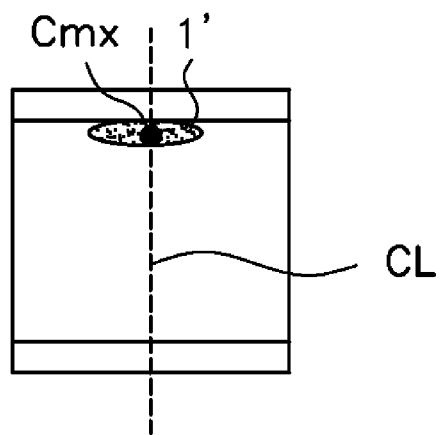
FIG. 2A schematically shows a cropped pseudo-projection image.

Referring now to FIG. 2A, a cropped pseudo-projection image is schematically shown. The image of cell 1 is axially translated so that the longitudinal component of the center of mass, $C_{mx}$, is aligned to a common axial position such as a centerline CL of a cropped pseudo-projection image 1. The translation of the image of cell 1 substantially eliminates axial drift error.

Figure 3:
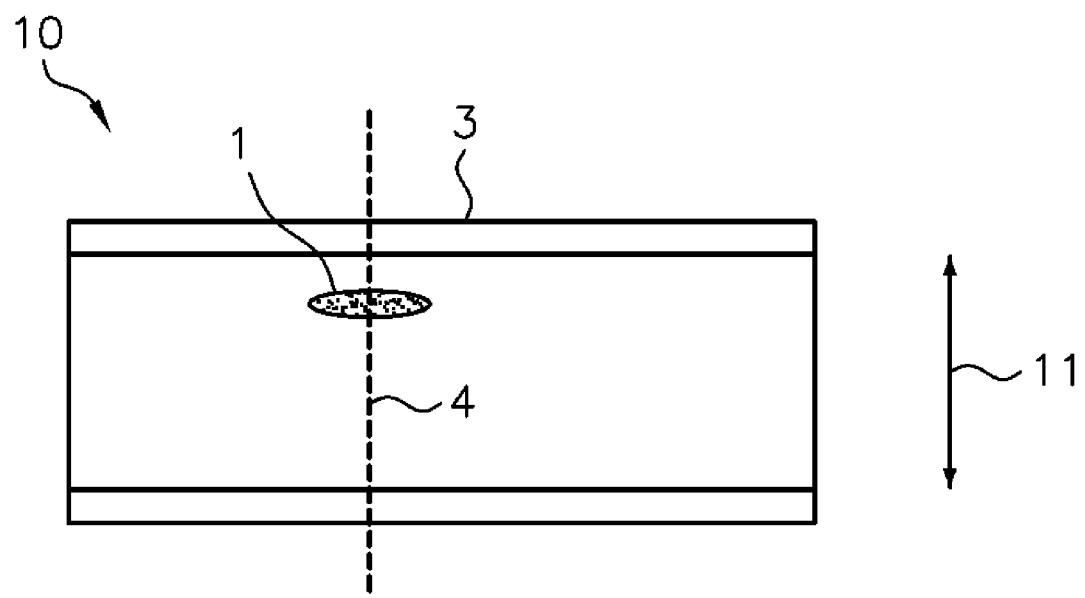
FIG. 3 schematically shows an example illustration of an object in a capillary tube exhibiting slight tube translation in a direction that may cause centering errors in an optical tomography system.

Referring now to FIG. 3, an example illustration of an object in a capillary tube exhibiting capillary tube drift is shown. Here a cell 1 is held in a capillary tube 3 by optical gel 10, where the tube 3 exhibits drift motion transverse to the longitudinal axis as indicated by double arrow 11, where the transverse motion produces centering errors during reconstruction of the image. The tube should be centered in a set of pseudo-projection images if post acquisition image reconstruction is to be successful, therefore it is advantageous to compensate for capillary tube drift prior to reconstruction of an image.

Figure 3A:
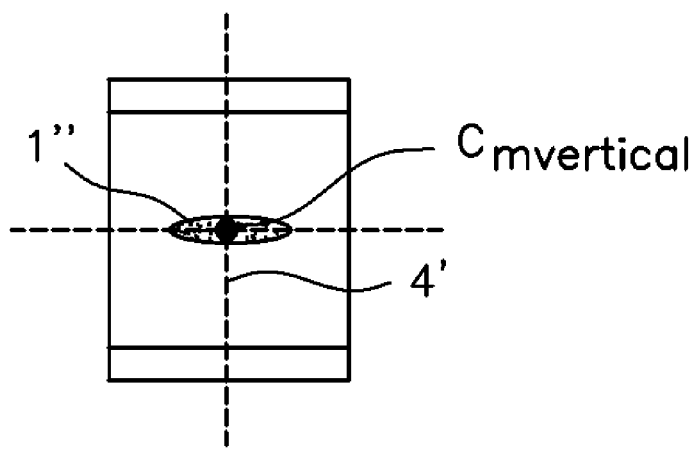
FIG. 3A schematically shows an example illustration of correction for capillary tube drift.

Referring now to FIG. 3A, there shown schematically is an example illustration of correction for capillary tube drift, which reduces centering errors by cropping a set of pseudo-correction images to produce a cropped pseudo-projection image 1'' for each pseudo-projection image, where the longitudinal component of the center of mass for the cell 1 has been translated to the centerline 4' of the image. For an object placed a distance R from the vertical centerline 4 of the capillary 3, the vertical component of the center of mass is described responsively to $R\cos(\theta)$ when there are no centering errors (where $\theta$ is the angular displacement of the object, R is the distance from the center of the tube to the object). When capillary drift occurs, the motion of the vertical center may be described as: $R \cos(\theta) + E_{vertical}(\theta)$, where $E_{vertical}$ is the error induced by tube drift. One useful means of correcting for correcting for $E_{vertical}$ is to translate the object so the vertical component of the center of mass is aligned with the vertical centerline 4' of a corrected image 1" for a set of pseudo-projection images.

Entropy as a Means of Further Reducing Axial and Vertical Drift

It has been found that center of mass translation methods for correcting axial and capillary drift work well so long as it is possible to accurately measure the center of mass. However, errors in center of mass measurement may be induced through several mechanisms.

Figure 4:
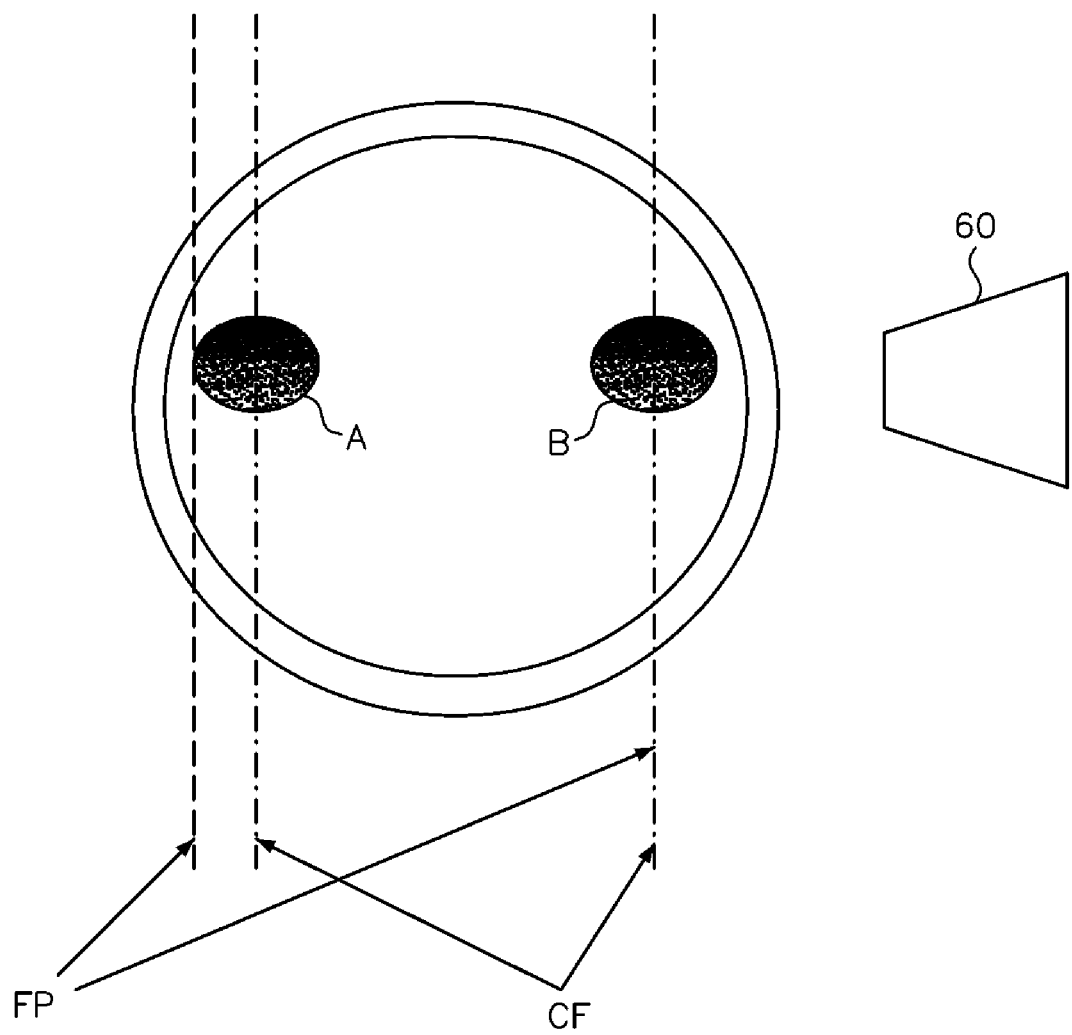
FIG. 4 schematically illustrates a poor focus condition leading to center of mass measurement errors.

Referring now to FIG. 4, there shown is an example of a focus error mechanism. Consider an object shown at two positions A and B. The object at position A and B should image the same way, and have the same center of mass, so long as the object is well focused at each location. Lines FP represent focus positions generating center of mass measurements that are different for positions A and B. Lines CF represent correct focus positions giving the same center of mass measurement for object at position A and B. Note that Lines FP and CF overlap through position B. Errors in focus may result in an error in the center of mass measurement, which, in turn, may induce errors in the alignment of the object, resulting in errors in reconstruction.

To correct residual errors in the center of mass a method of entropy correction is employed. Entropy measures the state of disorder of an image. Since axial and capillary drift result in a more disordered reconstruction, entropy may be used to provide feedback to an algorithm for adjusting errors in pseudo-projection centering remaining after center of mass correction.

Figure 5:
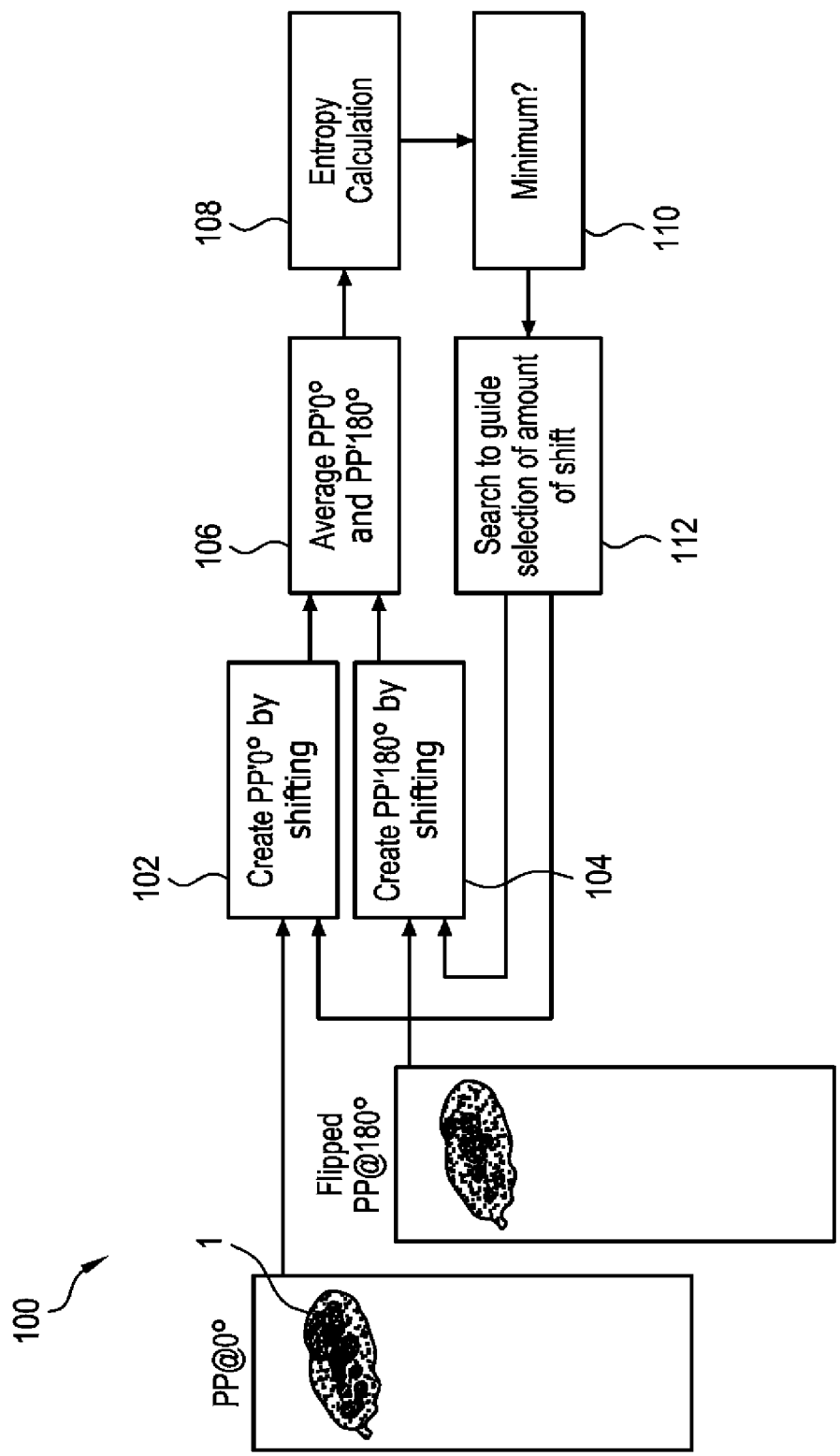
FIG. 5 schematically shows an example illustration of a use of entropy as a means of correcting alignment errors.

Referring now to FIG. 5, there shown schematically is an example illustration of an entropy-based method for correcting centering errors by finding an amount of shift to apply in order to align two pseudo-projection images that are opposed by 180 degrees. A first pseudo-projection image PP@0° and a second pseudo-projection image PP@180° of the same cell 1 are acquired at 0° and 180° respectively. Using digital imaging techniques, an entropy algorithm 100 for correcting centering errors is applied to the images. The entropy based algorithm 100 comprises a process including creating a modified image of PP@0° called PP'0° at step 102 by shifting PP@0° by a first estimated shift value, creating a modified image of PP@180° called PP'180° at step 104 also by shifting by a second estimated shift value, averaging PP'0° and PP'180° to produce an average pseudo-projection image at step 106. At step 108 an entropy value is calculated from the average pseudo-projection image. The entropy value is compared to the entropy value from previous iterations at step 110. If the optimum value is not reached at step 110, a correction factor is produced and a search method guides the selection of an amount of shift at step 112. A value for the amount of shift is produced and fed back into both step 102 and 104 and the method repeats until an optimum error factor is reached.

Entropy may be calculated in accordance with the following relationship: $S = -\Sigma (p_j/P) \log_2(p_j/P)$, where, for 8-bit images, j has values from 0 to 255, $p_j$ represents the number of pixels at the jth grey scale value composing the pseudo-projection, and P represents the total number of pixels in the pseudo-projection. As S approaches 0, entropy is minimized.

By using the entropy-based algorithm 100, the amount of shift to apply to center selected image pairs is found. The correction profile may be sampled by whatever degree of accuracy is desired. For example, if it is desired to sample the correction profile every 45 degrees then the corrections must be found for the selected image pairs 0, 180; 45, 225; 90, 270; and 135, 315.

Figure 6:
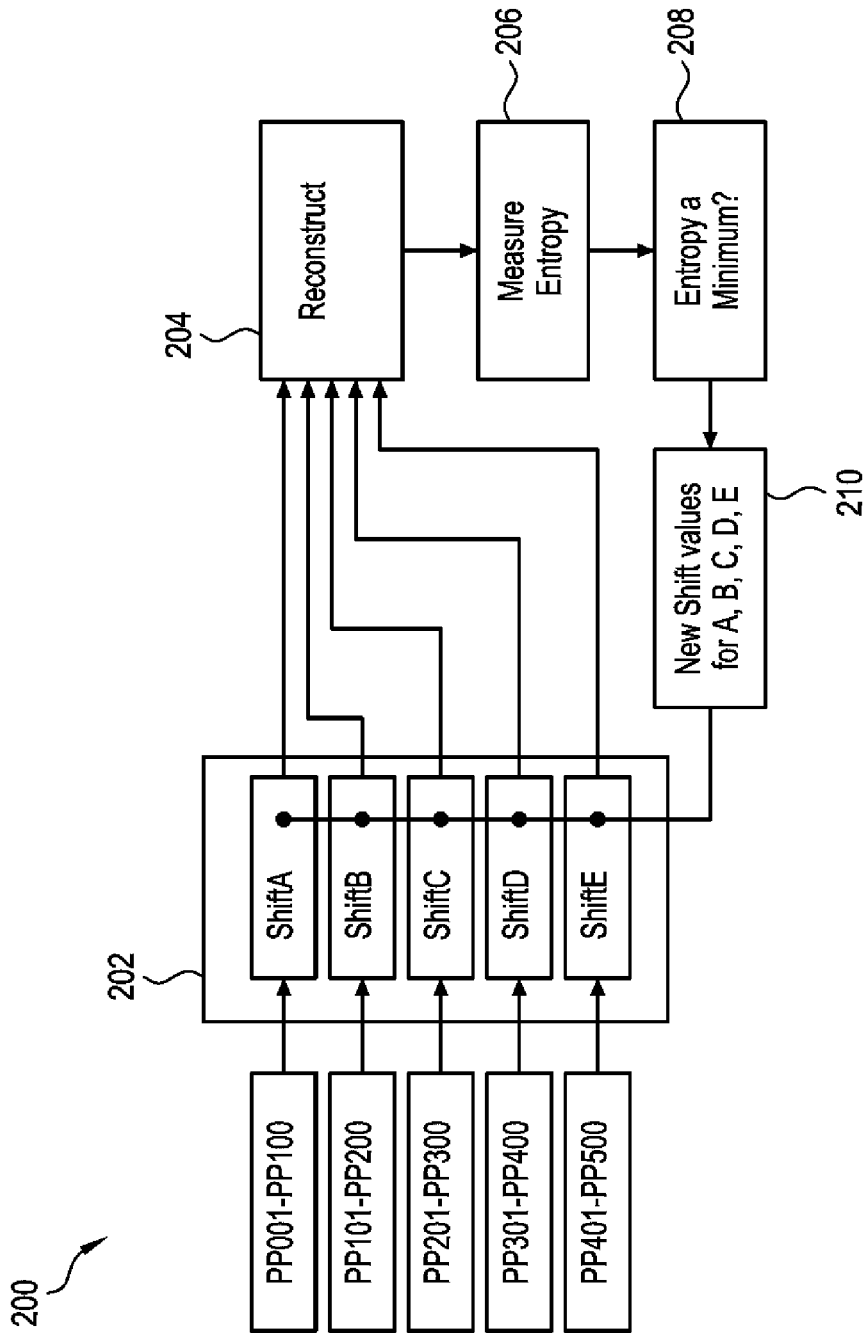
FIG. 6 schematically shows an example illustration of an alternative use of entropy as a means of correcting alignment errors in pseudo-projections.

Referring now to FIG. 6, there shown schematically is an example illustration of an alternative entropy based algorithm for centering pseudo-projections as contemplated by an example embodiment. An alternative entropy-based algorithm 200 employs an entropy measure computed based on a full reconstruction of a plurality of shifted pseudo-projections PP001-PP100, PP101-PP200, PP201-PP300, PP301-PP400, and PP401-PP500. Entropy that is based on a full reconstruction is likely to provide a more noise-free measure, and therefore more accurate shift values.

Alignment of the images with respect to each other is sufficient to obtain an optimal reconstruction. The images need not be aligned relative to the rotation axis. The alternate entropy-based algorithm 200 comprises a process including shifting each set of pseudo-projections at step 202, back-projecting and reconstructing sets of shifted pseudo-projections at step 204, measuring entropy at step 206 to produce an entropy value at step 206, comparing the entropy value to entropy values from one or more previous iterations at step 208 and, if an optimum entropy value is not reached, then generating a modified correction value at step 210. A search algorithm 210 uses the modified correction value to identify new shift values for each pseudo-projection at step 210. The new shift values A, B, C, D and E, are applied to the plurality of shifted pseudo-projections PP001-PP100, PP101-PP200, PP201-PP300, PP301-PP400, and PP401-PP500 at shift step 202. The process repeats from step 202 with new shift values applied until an optimum entropy value is reached.

The search algorithms employed in steps 112 (FIG. 5) and 210 (FIG. 6) may be a standard search algorithm such as the golden section search technique for finding the extremum (i.e. minimum or maximum) of a mathematical function, by successively narrowing brackets by upper bounds and lower bounds. Other useful algorithms include Brent's method and the like.

Correction for Illumination Variations

Figure 7:
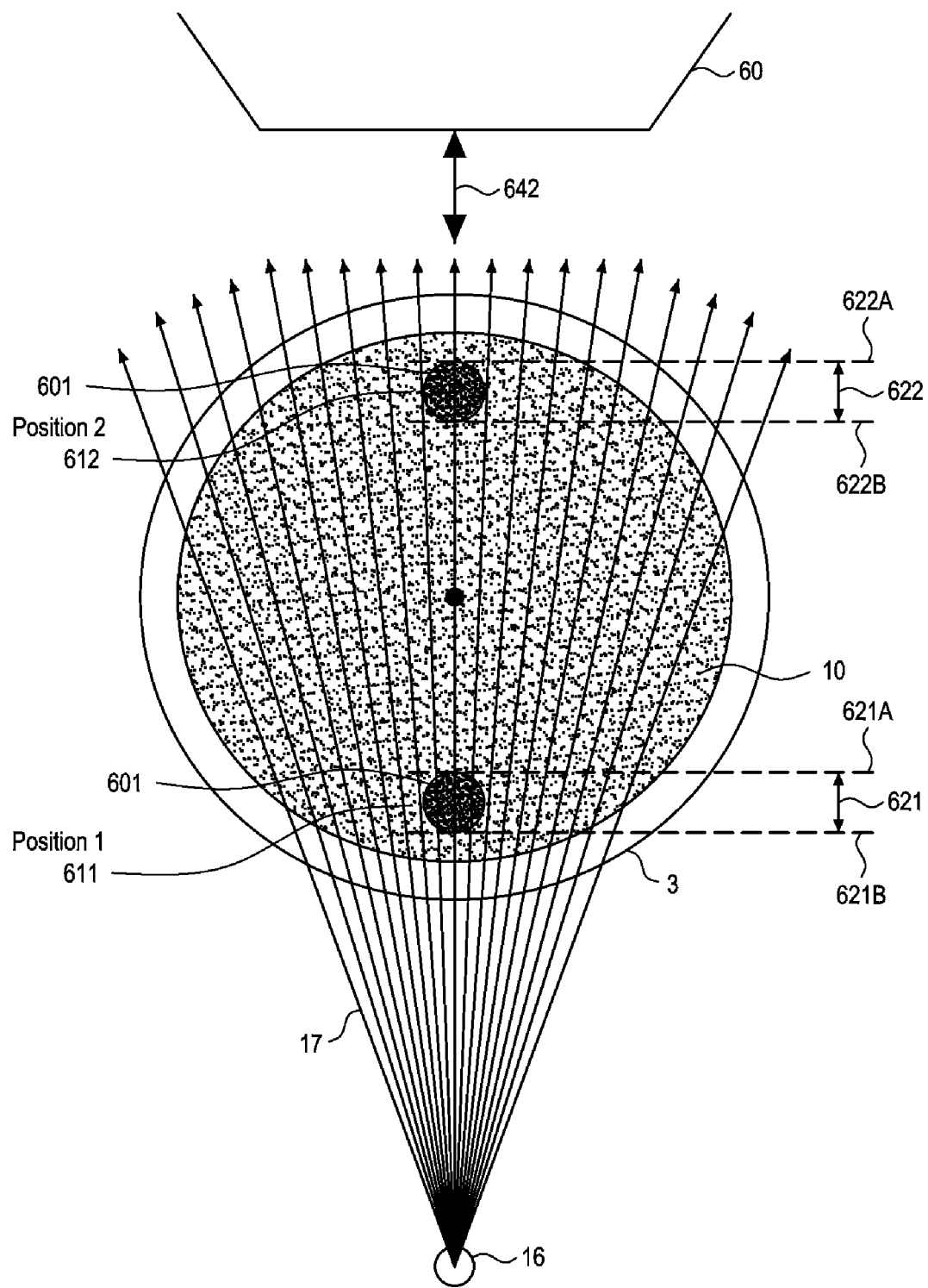
FIG. 7 schematically shows an example illustration of a particle in a capillary tube for the purposes of demonstrating the dependence of incident light on object position.

Referring now to FIG. 7, an example illustration of an object in a capillary tube 3 filled with optical gel 10 for the purposes of demonstrating the dependence of light intensity of location is schematically shown. A source of light 18 illuminates an object 601 placed first at Position 1 611 and then at Position 2 612. The objective lens 60 moves through a first scan range 621 as it scans Position 1 and a second scan range 622 as it scans Position 2. As scanning changes from the vicinity of Position 1 611 to the vicinity of Position 2 612, it occurs at a greater distance from a source of incident light 16. As a result of the change in the scan location the light captured by the objective lens 60 in the vicinity of Position 1 611 will be more intense than light captured by it in the vicinity of Position 2 612. This is conceptually shown with the pattern of light rays 17 emanating from the source 16. Thus, pseudo-projections produced from the scan ranges 621, 822 may not be consistent. Such changes in incident lighting as a function of scan location may introduce adverse effects in post-acquisition reconstructed images. It will be understood by those skilled in the art and having the benefit of this disclosure that the above-described lighting effects also apply to other lighting techniques, such as, for example, a microscope condenser system using Koehler illumination and equivalents.

In one example embodiment as implemented by Vision-Gate, Inc. of Washington State, for example, two pseudo-projections acquired over scan ranges having a center-to-center separation of about 40 microns along optical axis can differ in intensity by 4.4%. This difference may be manifested, for example, when scanning a small object located near the inner wall of a microcapillary tube having a diameter of 40 microns. The highest intensity occurs when the scan range is near the portion of the capillary tube wall 3 closest to the light source, corresponding to Position 1 611, while the lowest intensify occurs when the scan range near the portion of the capillary tube wall 3 farthest from the light source, corresponding to Position 2 612.

In order to correct for such illumination variations it is necessary to know the illumination gradient and the average location of the objective lens during each scan. The average location of the objective lens may be calculated as the distance of the center of the object from the tube center. Using the illumination gradient and lens location information, a weighting factor for each pseudo-projection may be applied when reconstructing the tomographic image.

For example, a method for compensating for differences of incident light in different focal regions a correction takes into account a first illumination gradient g. Here illumination gradient g represents a percentage change in grey scale value per micron that may be estimated either a priori or dynamically. An a priori estimate of the gradient may be made by measuring slice data in a blank region of a calibration slide illuminated by the same light source used for producing the pseudo-projections, for example. The illumination gradient may also be estimated by averaging gray level values in the pseudo-projection data set. In this example embodiment, a blank region of the field of view is advantageous, but not required, so long as the number of absorbing features in the region so examined remains constant throughout the data set.

Once the illumination gradient g is known, a correction factor to compensate for location changes may thus be determined as follows. If the location of the scan range varies with the angular rotation of the tube 3 according to the formula Z=R sin(T), then for an illumination gradient g, the intensity of light captured by the optical system may, for example, be described as $$I(T)=I(0)\times[1-gR\sin(T)]$$

Where g is the illumination gradient;

T is the rotation angle of the tube;

I(T) is the intensity captured by the optical system for the pseudo-projection acquired at angle T, in a blank region of the field of view;

Z is the distance along the optical axis from the center of the scan range to the center of the tube; and R is maximum distance from the center of the tube to the center of the scan range over the course of the angular rotation of the tube.

In this example illustration the grey scale values in each pseudo-projection may be modified by weighting them according to the formula $$\Omega(T)=[1-gR\sin(T)]^{-1}$$

so that the intensity for pixel coordinates X and Y, J(X, Y; T), used for post-acquisition processing of the pseudo-projection is given by $$J(X,Y;T)=I(X,Y;T)\Omega(T).$$

Owing to the typically small departures from unify in the denominator, the above multiplication step is best performed within a reconstruction program that processes the grey scale values as floating-point values, rather than as integer values.

Thus, to compensate for illumination variations due to such differences in lens locations an example method includes;
  a) acquiring a set of pseudo-projections from a plurality of viewpoints about an arc at least partially encircling the specimen region;
  b) weighting each pseudo-projection in the reconstructed tomographic image in inverse proportion to its departure from a baseline illumination level; and
  c) reconstructing the set of weighted pseudo-projections through backprojection and filtering of the images to create a reconstructed tomographic image.

An additional correction may be applied during backprojection, in order to compensate for variation in ambient illumination levels during the course of acquiring a single pseudo-projection. The scan range 621 covers a distance along the optical axis 642 from location 621A to 621B. As taught in the preceding discussion, the light intensify changes from one extreme to the other. However, the pseudo-projection yields only the integrated value of the intensity for each pixel. This can lead to ambiguity in terms of the transmittance through the object, in which an object located at the top of the scan range 621A produces the same drop in grey scale value as a less absorbing object located at the bottom of the scan range 621B, due to the difference in the intensity of the incident light. To compensate for the effect of this illumination gradient, each backprojected line segment can be weighted according to its proximity to the condenser lens. If the scanning range is constant for a set of acquired pseudo-projections, i.e., the distance from 621A to 621B is the same as the distance from 622A to 622B, then the weighting of the backprojected segments can retain the same set of values for the pseudo-projections in the data set. The change in the light intensify can be determined by using, for example, the previous methods described above. For example, if the light intensity depends on the location along on the optical axis Z according to $$I(Z)=I(0)\times[1-gZ]$$

then the accumulated light in a pseudo-projection, acquired over a scan range $\Delta Z$ from $Z_1$ to $Z_2$, would be $$I(PP,0)=I(0)\times[\Delta Z-g(Z_2^2-Z_1^2)/2].$$

in the absence of light absorption. A grey scale value, $G_0$, would correspond to I(PP, 0). If there is a thin light absorbing object present in a portion of the field of view which reduces the incident light by a factor $\beta$, then the accumulated light in the pseudo-projection in that portion of the field of view becomes $$I(PP,\beta)=I(PP,0)-I(0)\times(1-gZ_c)\times(\beta-1)\delta Z$$

where $Z_c$ is the location along the optical axis of the absorbing object ($Z_1 \leq Z_c \leq Z_2$). The corresponding grey scale value would be $G_1$. Note that a single value for $G_1$ can be the result of many combinations of $(1-gZ_c)\times(\beta-1)$, with the ratio of the maximum and minimum values of the absorption factor related by $$(\beta_{max}-1)/(\beta_{min}-1)=(1-gZ_1)/(1-gZ_2).$$

In this example, the ambiguity can be removed by applying the following transformation to the measured grey scale values for each voxel in the backprojection:

$$G(Z) \to (G_0 - G_1)/(1 - gZ).$$

Note that this means as each pseudo-projection is backprojected, the grey scale value assigned to each voxel changes with the depth, even along a single backprojected line.

Figure 7A:
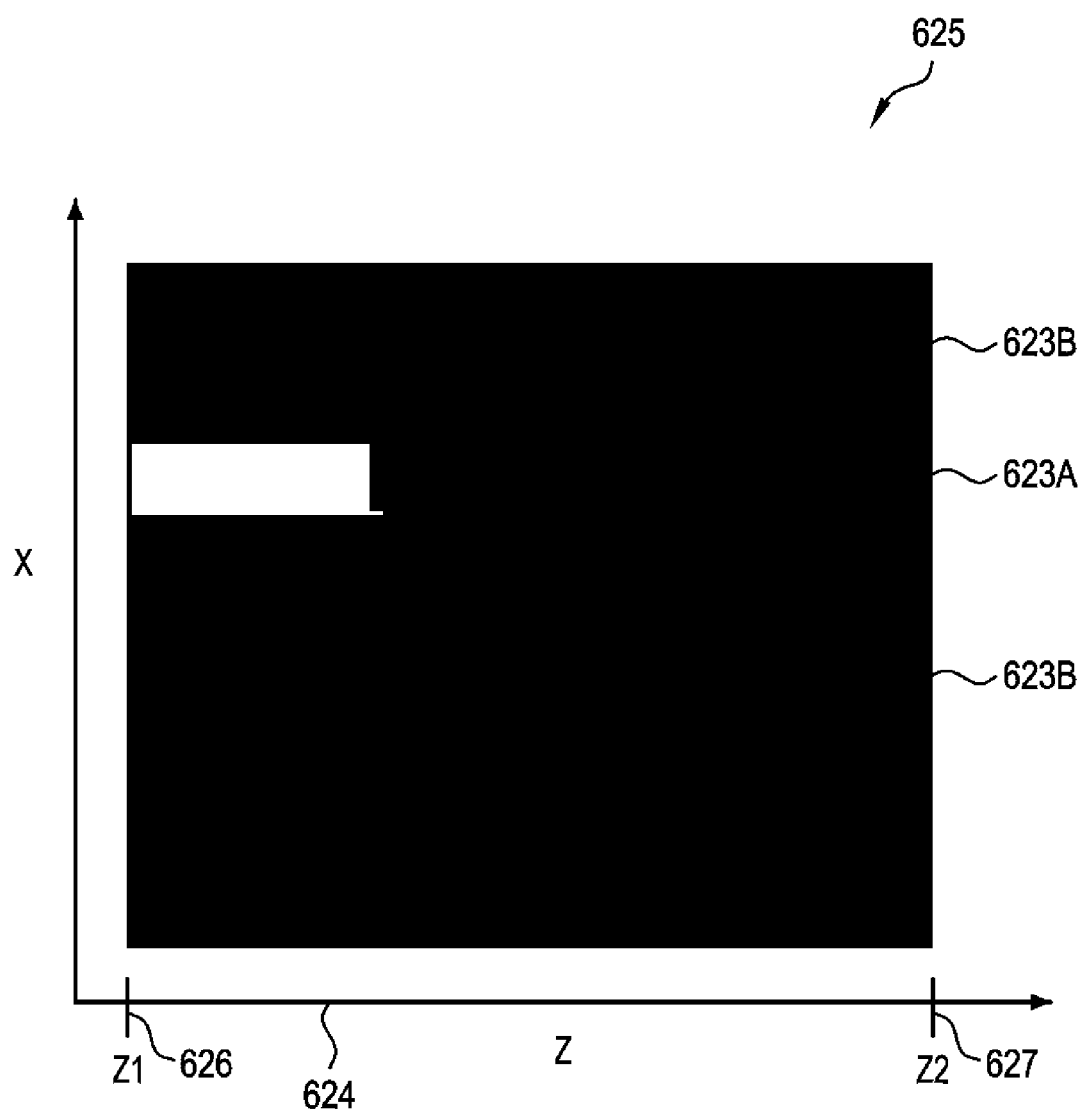
FIG. 7A illustrates there illustrated is an example of back-projected values for a single row of a pseudo-projection as may be produced by the system of FIG. 7.

Referring now to FIG. 7A, there illustrated is an example of backprojected values for a single row of a pseudo-projection as may be produced by the system of FIG. 7. The brightness of each backprojected line 623A, 623B changes with the extent of the backprojection along the Z-axis 824 from the portion of the reconstruction space 625 corresponding to Z1 626 to that portion corresponding to Z2 827.

If the specimen has been labeled with fluorescent molecules (fluorophores), a different grey scale transformation can be used when the fluorophores are subjected to high enough light intensity to cause saturation. In this situation, the fluorophores remove the same amount of light from the bright-field image and emit the same amount of fluorescent light as the incident light increases. If the amount of light removed when the fluorophores are saturated is g, then the intensity of the transmitted (bright-field) image is $$I(PP, \gamma) = I(PP, 0) - \gamma$$

with a corresponding grey scale value G1:

$$G_1 = G_0 - \Gamma$$

where G0 is the grey scale value that corresponds to an intensity of I(PP, 0). Thus a suitable transformation to obtain a map of γ is $$G_1 \to G_1 - G_0.$$

Both types of correction for illumination, i.e., the weighting function Ω and the backprojection transformation G→G', may be used together.

Correction for Beer's Law Effects

In yet another alternative example embodiment it has been discovered that errors due to the effect of Beer's law or the Beer-Lambert Law (See H. C. van de Hulst, Light Scattering by Small Particles, Peter Smith Pub. Inc. (June 1982) can be compensated for during image reconstruction. Beer's law predicts that the intensity of light, I, that arrives at a detector is governed by the relationship of equation 1.

$$I = I_0 e^{-kd}. \qquad \text{Equation 1}$$

In equation 1, $I_0$ is the intensity of incident illumination, k is the extinction coefficient for the object the light is passing through and d is the distance through which the light travels. One objective in the final reconstructed 3D image of the pseudo-projection image set is to find the extinction coefficient, k, as if is distributed throughout the object. In particular, images must be processed so that, when reconstructed into a 3D reconstruction, the voxel grey level values are representative of the extinction coefficient, k, as indicated by Beer's law in equation 1. The effect of Beer's law may be compensated for by processing the pseudo-projection images with a logarithmic function:

$$\ln(I) = \ln(I_0) - kd$$

The presence of the constant, $\ln(I_0)$, is not significant for the reconstruction as the background DC illumination level is removed by the backprojection and filtering algorithm. Compensation is further added to this processing to ensure that the resulting image spans the range of grey levels inherent in the original image. Therefore:

$$\text{Image}_{log} = C * \ln(\text{Image})$$

where Image is a projection, such as a pseudo-projection, and C is chosen such that the span of grey scale values is substantially equal in Image and $\text{Image}_{log}$. The value of C depends on the bit-depth of the image according to the following relationships;

| Bit Depth of Image Data | C |
|---|---|
| 8 | $255/\ln(255) \approx 46$ |
| 12 | $4095/\ln(4095) \approx 492.3$ |

Figure 13A:
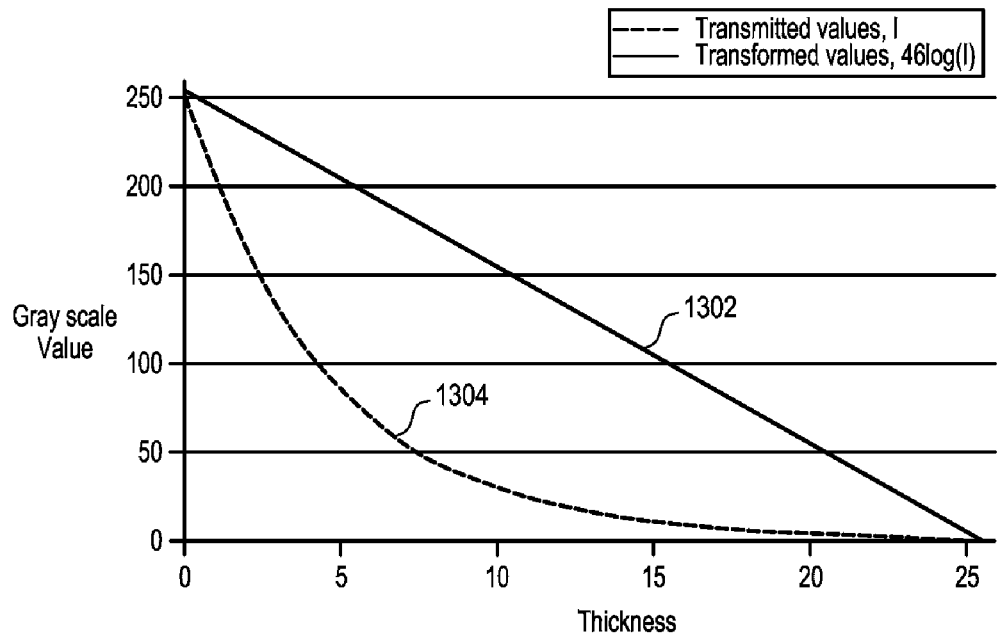
FIG. 13A is a graph illustrating relationships between transmitted and transformed grey scale values and material thickness

Referring now to FIG. 13A, there shown is a graph illustrating relationships between transmitted and transformed grey scale values and material thickness. Curve 1304 shows transmitted values of light intensity, I, decreasing as light passes through increasing thicker absorbing materials. Curve 1302 illustrates transformed logarithmic values derived from applying a logarithmic transform to the measured values of curve 1304. These values become linearly dependent on the depth, and hence can be added together in a linear fashion from many pseudo-projections without unduly weighting some pseudo-projections more than others. This transformation changes the 3D reconstruction from a map of light transmittance to a map of extinction coefficients. In Equation 1

$$I = I_0 \exp(-kd)$$

the right-hand side can be measured; the logarithmic transform converts the measured values into values of k.

Figure 13B:
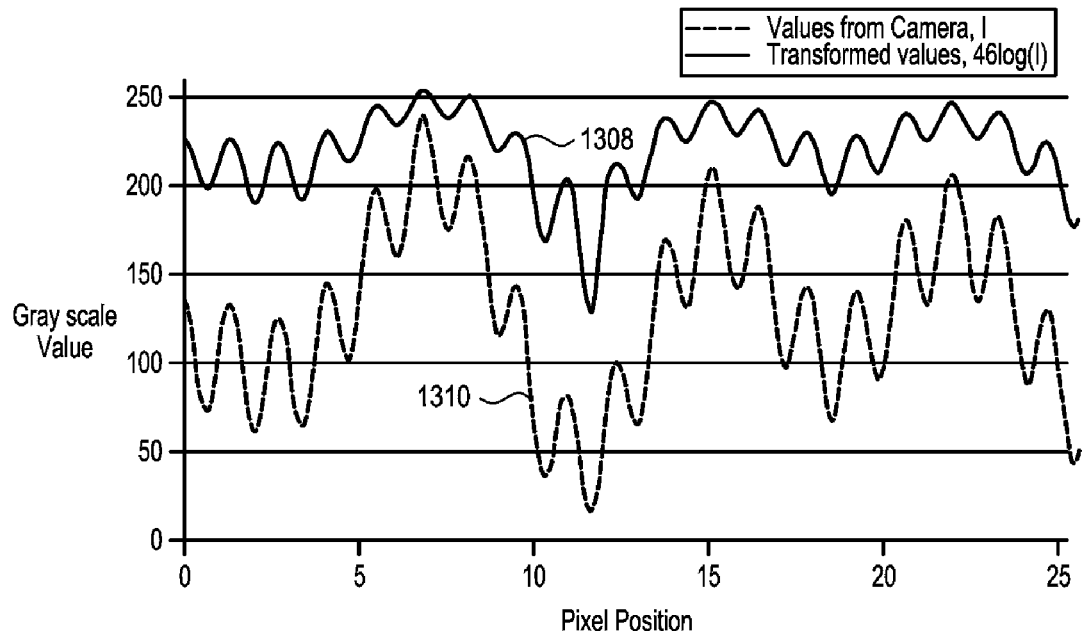
FIG. 13B illustrates the logarithmic transformation of grey scale values of a single column of image data.

Referring now to FIG. 13B the logarithmic transformation of grey scale values of a single column of image data is illustrated graphically. Curve 1310 represents grey scale values plotted against pixel position. Curve 1308 represents transformed logarithmic values derived from curve 1310.

Reduced Computation Volume

An additional concern that arises when computing a 3D reconstruction from backprojection values is the amount of time required to perform the large number of computations. However, if the object of interest is much smaller than the field of view in the acquired images (as may be the case if the object is small and not located near the axis of rotation), then not all of the reconstruction volume needs to be computed. Instead only a sub-volume needs to be computed. From projections taken at two orthogonal angles (e.g., zero and 90 degrees), the dimensions and location of a bounding box within the reconstruction volume of the object of interest can be determined. By calculating the backprojected values only within the confines of the bounding box, the number of calculations required can be greatly reduced, thereby improving throughput speed by a large factor. For example, if the reconstruction volume comprises a cylinder, having diameter of 1,024 voxels and a height of 501 voxels, and the object of interest comprises a bounding box with dimensions of 150×120×100 voxels, reducing the number of calculations by a factor of 292, as compared with the full reconstruction volume (1,024×1,024×501 voxels). This method allows an entire object of interest to be reconstructed, even when the 3D sub-volume of the bounding box does not include the axis of rotation.

In another example, the sub-volume may take the form of a partially hollow cylinder or box. This sub-volume can be advantageous when, for example, the focal planes of the pseudo-projection do not pass through the entire depth of the object of interest. In such cases, the backprojected volume of a pseudo-projection is truncated, and a gap will form between the backprojected volumes of opposing (e.g., 0 and 180 degree) pseudo-projections. As a result, the sub-volume of the completed set of pseudo-projections encircles a hollow cylinder, while the outer boundary of the sub-volume may take the shape of a cylinder, box, or any arbitrary 3D surface.

Figure 14:
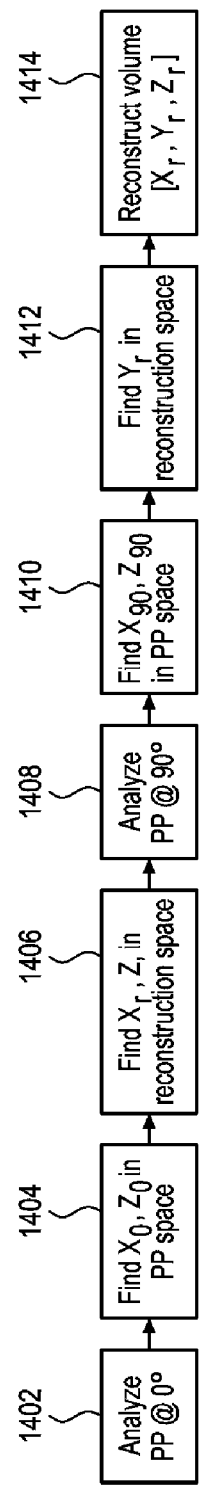
FIG. 14 depicts schematically the determination of the bounding box parameters, as contemplated by an example embodiment.

Referring now to FIG. 14, an example of a method for determination of bounding box parameters for a region of interest including an object is schematically depicted. The example includes:

analyzing a pseudo-projection (PP)@0° 1402 by finding the edges of the region of interest to determine a bounding box;

finding a set of coordinates $X_0$, $Z_0$ in PP space 1404;

finding a set of coordinates $X_r$, $Z_r$ in reconstruction space 1406;

analyzing PP@90° 1408 by finding the edges of the region of interest to determine a bounding box;

finding a set of coordinates $X_{90}$, $Z_{90}$ in PP space 1410;

finding a set of coordinates $Y_r$ in reconstruction space 1412; and reconstructing volume using a set of coordinates $[X_r, Y_r, Z_r]$ 1414, where the set of coordinates in reconstruction space $[X_r, Y_r, Z_r]$ map to the sets of coordinates in PP space.

Figure 15:
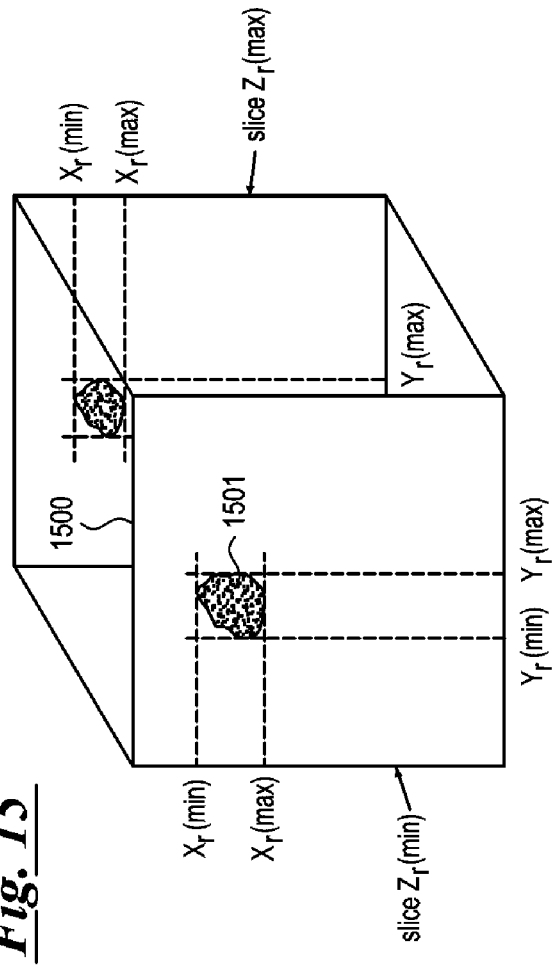
FIG. 15 illustrates the parameters associated with the bounding box parameters, as contemplated by an example embodiment.

Referring now to FIG. 15, parameters associated with the bounding box parameters are illustrated. A bounding box 1500 in reconstruction space includes a number of reconstruction slices=$Z_r(max)-Z_r(min)+1$. An object of interest 1501 is contained in the bounding box bounded by parameters $X_r(min)$, $X_r(max)$, $Y_r(min)$, $Y_r(max)$, and $Z_r(max)$, $Z_r(min)$.

Reconstruction by Sectioned Pseudo-Projections

Figure 8:
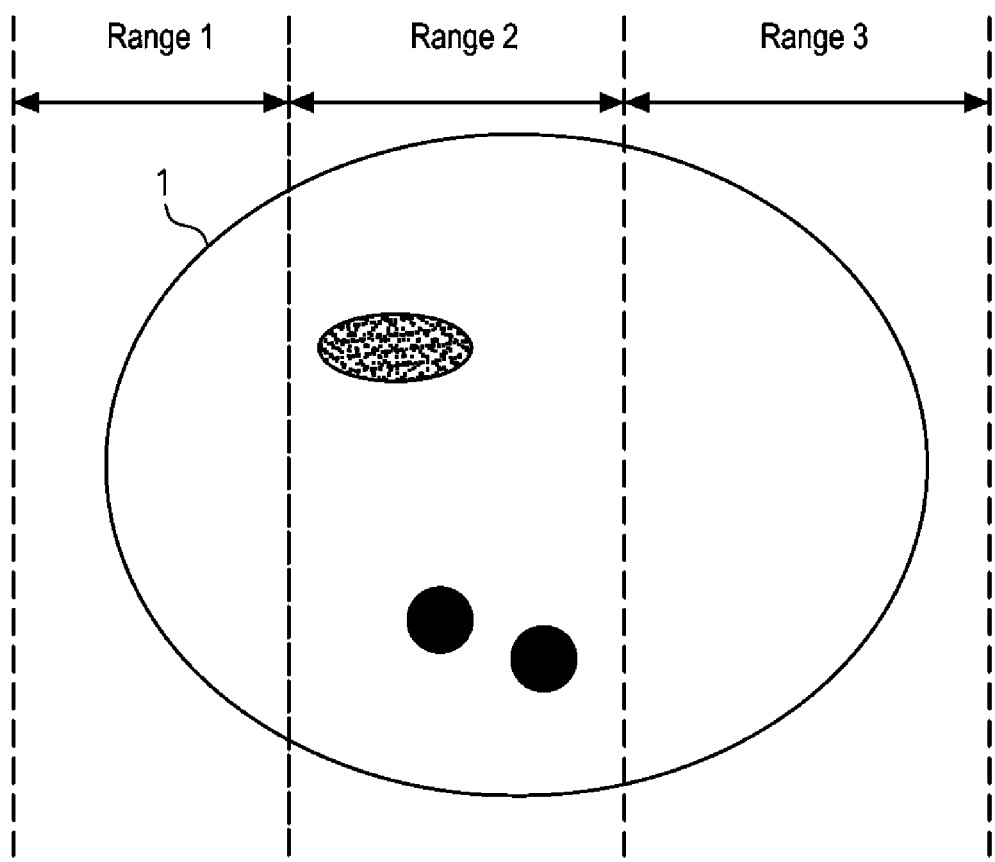
FIG. 8 schematically shows an example illustration of acquired regions of a set of sectional pseudo-projections.

Referring now to FIG. 8 an example illustration of an alternate method for collecting pseudo-projections by sectioning a projection is schematically shown. According to the sectional projection method, a full projection scan of an object, such as cell 1, is divided into a plurality of sectional scans Range 1, Range 2 and Range 3. Using sectional pseudo-projections from each of a plurality of differing perspective view angles during backprojection produces sections of higher resolution than can be obtained from pseudo-projections made from a single overall scan of the object. This results not only from reduced defocusing aberration, but also because each section possesses different optical properties that can be treated separately.

Figure 9:
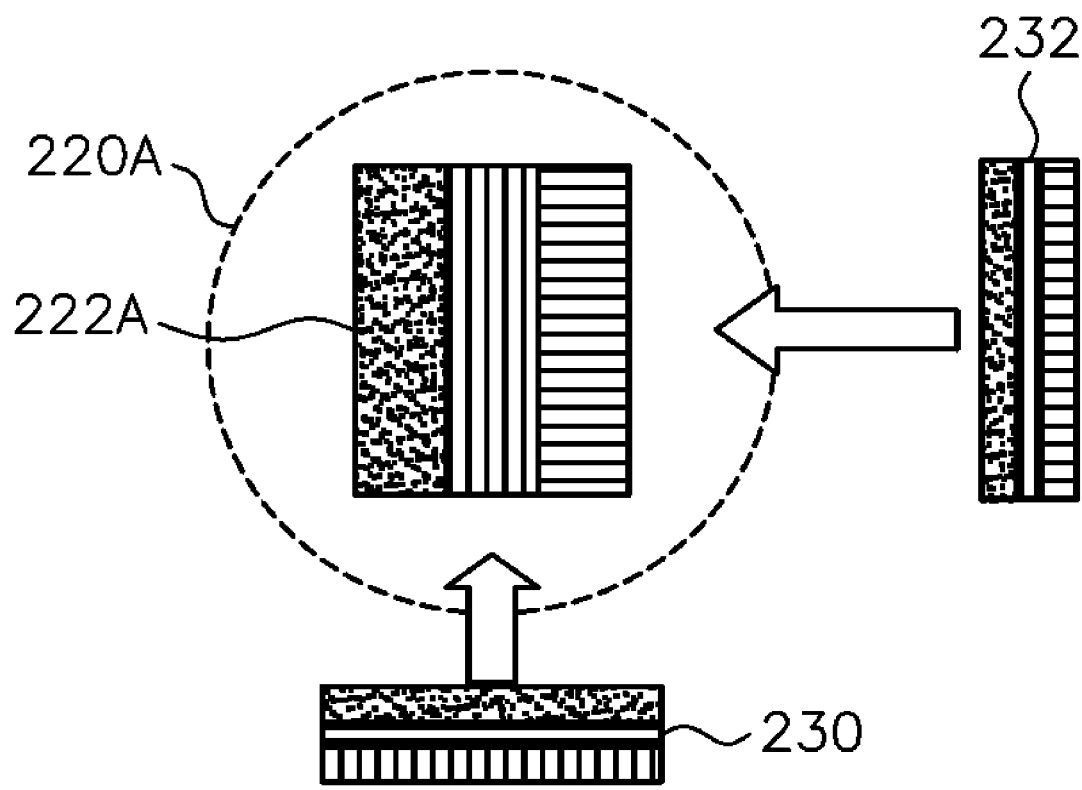
FIG. 9 schematically shows an example illustration of collecting a set of sectional pseudo-projections.

Referring now to FIG. 9, backprojection of sectional pseudo-projections is schematically shown. Here a sectional backprojection 222A in a subdivided reconstruction circle 220A is formed by the backprojection of sectional pseudo-projections 230, 232 obtained from differing perspective view angles. Backprojecting in the subdivided reconstruction circle 220A preserves detail in the sectional pseudo-projections and permits flexibility in the way that the backprojections are weighted in a reconstruction of the entire image. For example, the outer sections of the sectional pseudo-projection may be weighted at a lower value than the sandwiched middle section of the sectional pseudo-projection, thus allowing a reconstruction to develop that reflects confidence in the original pseudo-projection data.

Referring now jointly to FIG. 10A through FIG. 10D, illustrated therein is a phenomenon called "self-aberration," where the retractile nature of an object relative to its surroundings causes a loss of spatial frequency content in the image of said object. This self-aberration effect is independent of the asymmetric 3D PSF of the objective lens, and holds true for fixed focus images as well as for pseudo-projections. Loss of spatial frequency content in the image is not uniform throughout the object, it is dependent on the combination of location of features within the object and the viewing angle.

Figure 10D:
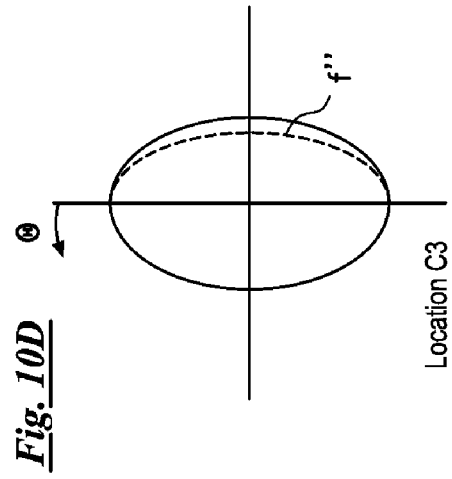
FIG. 10D shows the cutoff lateral spatial frequency as a function of θ for a sectioned pseudo-projection having a scan range passing through a third location for a set of viewing angles θ.
Figure 10A:
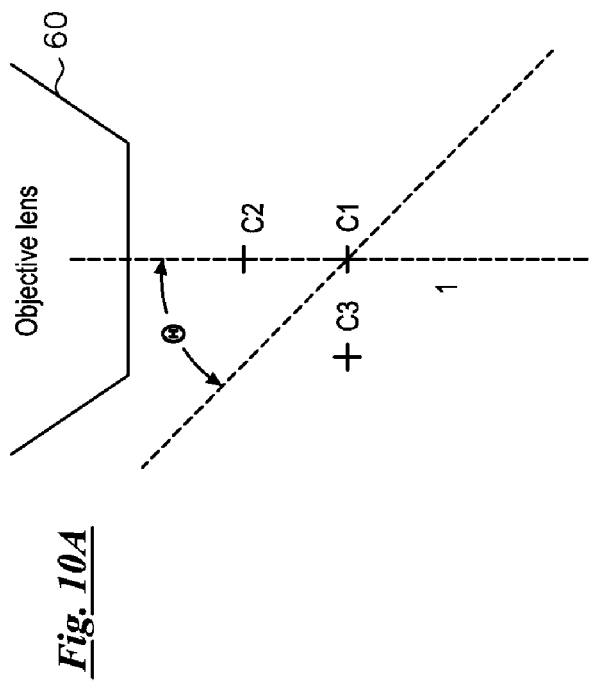
FIG. 10A illustrates three cellular sub-objects located in different locations within a biological cell.

Referring now specifically to FIG. 10A, three locations within the object (i.e. cell), and the frame of reference for viewing the object and its features at locations C1, C2, and C3 are shown. Location C1 is centered in the object Location C2 is off center along the optical axis, while location C3 is off center and transverse to the optical axis.

Figure 10C:
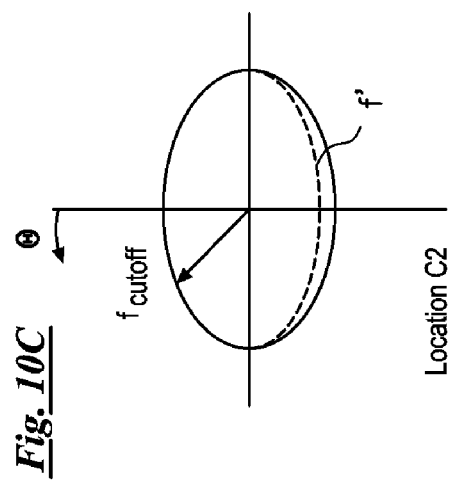
FIG. 10C shows the cutoff lateral spatial frequency as a function of θ for a sectioned pseudo-projection having a scan range passing through a second location for a set of viewing angles θ.
Figure 10B:
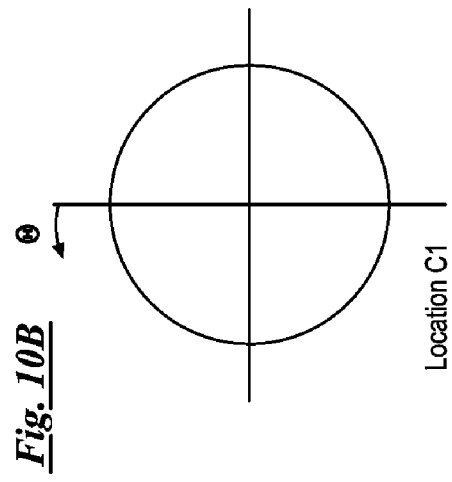
FIG. 10B shows the in-plane, lateral cutoff spatial frequency as a function of θ for a sectioned pseudo-projection having a scan range passing through a first location in the center of the object, for a set of viewing angles θ.

Referring now to FIG. 10B, an in-plane, lateral cutoff spatial frequency plot as a function of θ for a sectioned pseudo-projection having a scan range passing through the first location in the center of the object is shown. Mote that the power spectrum cutoff frequency does not vary with angle (θ) for location C1 when the object is idealized as spherical.

Referring now to FIG. 10C, cutoff lateral spatial frequency plot as a function of θ for a sectioned pseudo-projection having a scan range passing through a second location for a set of viewing angles θ is shown. Note how the power spectrum cutoff frequency varies with angle (θ) for location C2. Loss of resolution is most pronounced for location C2 at 0 and 180 degrees, while maximum resolution occurs at 90 and 270 degrees. Dotted line f indicates a second-order effect where loss of resolution is even more pronounced at 180 degrees than at 0 degrees.

Referring now to FIG. 10D, a cutoff lateral spatial frequency plot as a function of θ for a sectioned pseudo-projection having a scan range passing through a third location for a set of viewing angles θ. Note how the power spectrum cutoff frequency varies with angle (θ) for location C3. Loss of resolution is most pronounced for sub-object C3 at 90 and 270 degrees, while maximum resolution occurs at 0 and 180 degrees. Dotted line f'' indicates a second-order effect where loss of resolution is even more pronounced at 270 degrees than at 90 degrees.

Figure 11A:
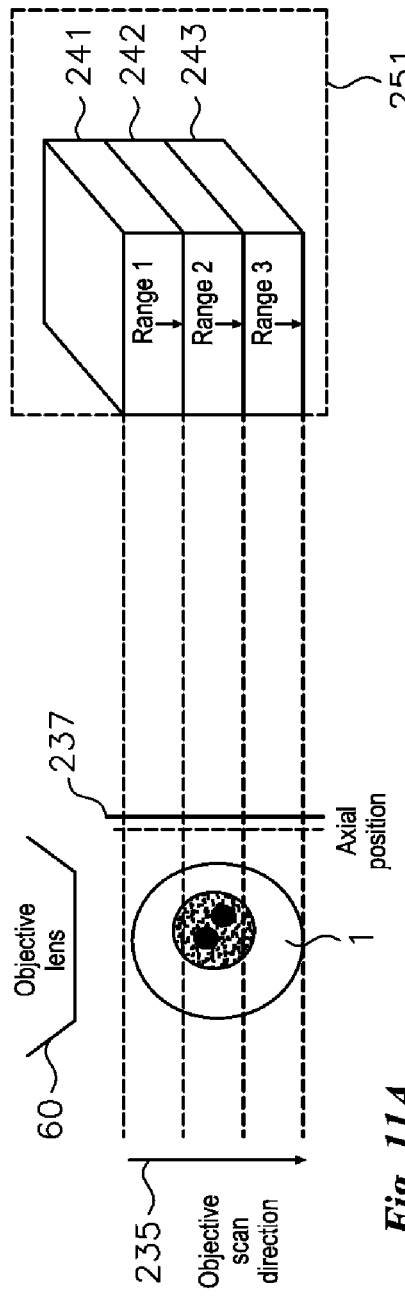
FIG. 11A schematically shows an example of acquisition of a set of sectional pseudo-projection data to produce accurate 3D reconstructions.

Referring now to FIG. 11A an alternate example of sectional backprojection using weighting based on an assessment of frequency content of the pseudo-projection sections is shown. As illustrated above, specimen-induced aberration during imaging of whole cells results in a loss of resolution. In a typical case, resolution varies along the optical scan axis, and spatial frequency cutoff of the image decreases as the plane of the cell perimeter becomes closer to the focal plane. Using sectional backprojection with weighting based on frequency content mitigates the detrimental effects associated with imaging whole cells in a single pseudo-projection. It accomplishes this by compensating for the anisotropy of the PSF in different scanning regions of the cell.

An objective lens 80 scans through an object, as for example, cell 1, in objective scan direction 235. Axial position of the cell 1 is indicated by axial position scale 237. Referring again to FIG. 11A, a scanned pseudo-projection is sectioned into scanning sections Range 1 241, Range 2 242, and Range 3 243, forming an image stack 251 of pseudo-projection data.

Figure 11C:
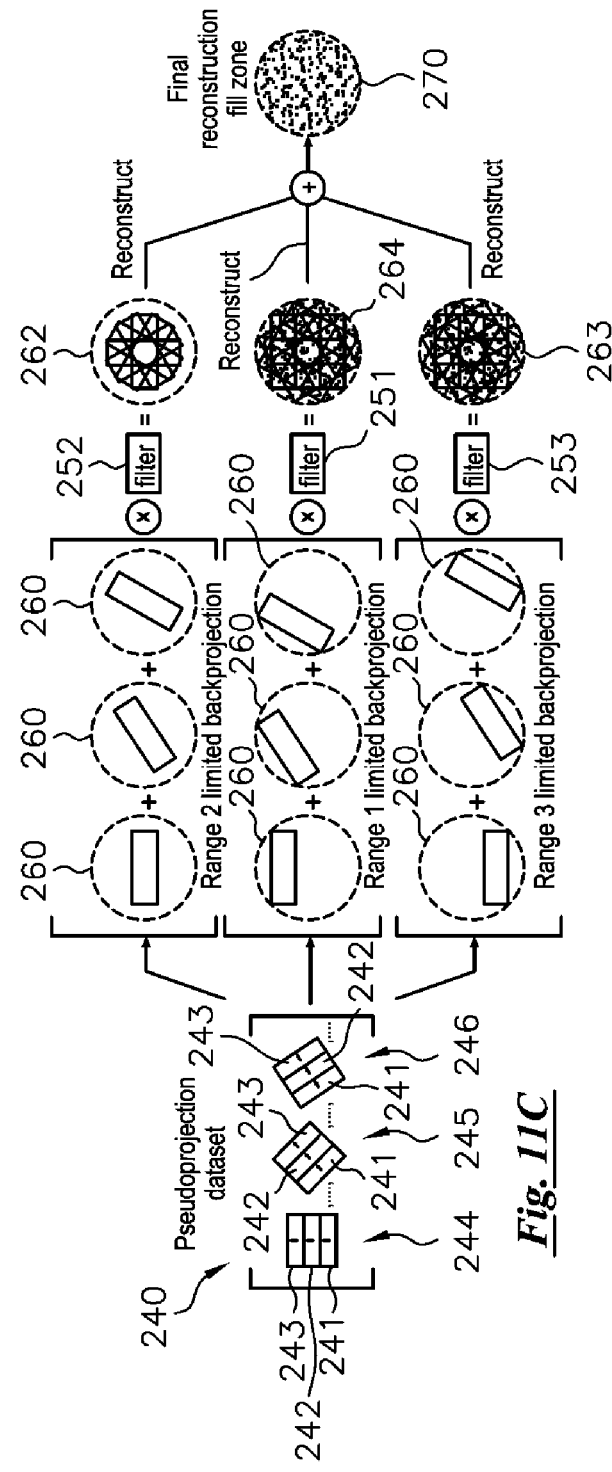
FIG. 11C illustrates an example of a set of sectioned pseudo-projection data obtained for a selected cell.
Figure 11B:
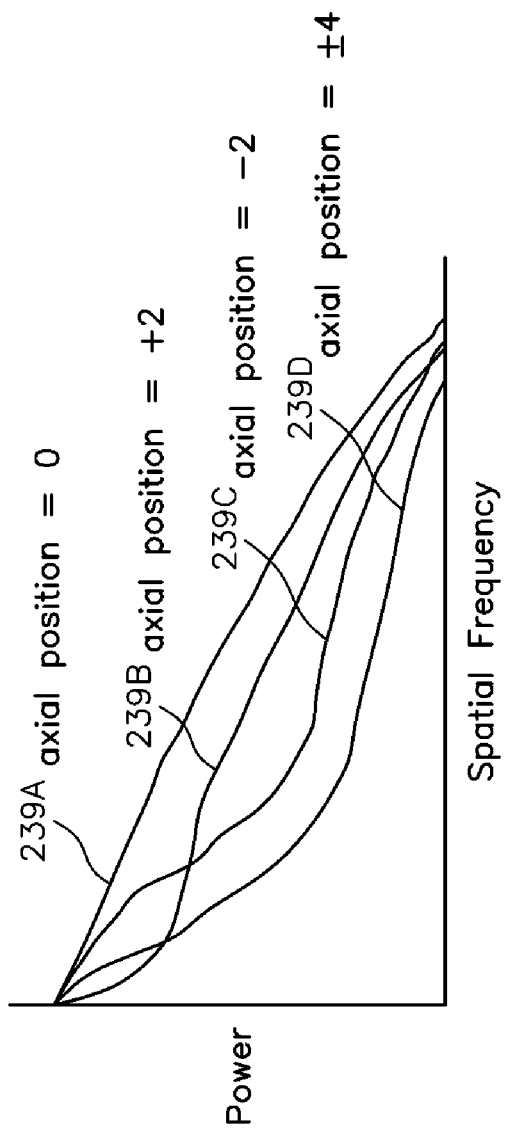
FIG. 11B illustrates an example of spectral power as a function of the axial position and spatial frequency.

Referring now to FIG. 11B an example of spectral power as a function of the axial position and spatial frequency is illustrated. Spectral power as a function of the axial position and spatial frequency is represented by curves 239A, 239B, 239C and 239D. Curve 239A represents spectral power for an axial position=0. Curve 239B represents spectral power for an axial position=+2. Curve 239C represents spectral power for an axial position=−2. Curve 239D represents spectral power for an axial position=±4.

In one example, spatial frequency roll-off can be measured by;
1) imaging a cell by scanning a focal plane to find a peak focus score;
2) acquiring an image stack including a plurality of sectioned images through the entire cell relative to a center, where the center is defined as a peak focus score;
3) calculating a spatial frequency power spectrum of each image in the image stack;
4) repeating actions 1) through 4) for a plurality of cells; and
5) plotting an average spectral power curve for each axial position for the plurality of cells to determine an average spectral power as a function of position along the optical axis.

The number of cells used for measuring spectral power curves should be more than 100. A large number of cells is necessary so that differences in structure from one cell to another are evened out when their individual power spectra are averaged together.

Figure 11E:
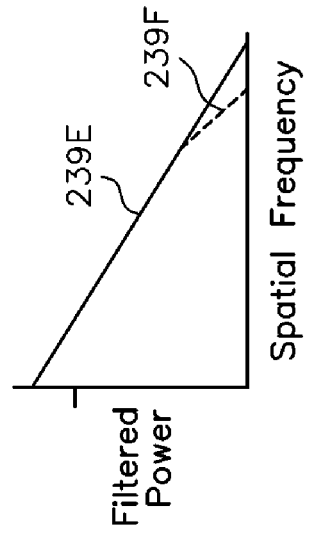
FIG. 11E illustrates an example of a power spectrum including the attenuation of power of higher spatial frequencies due to the lower signal-to-noise ratio at the higher spatial frequencies.
Figure 11D:
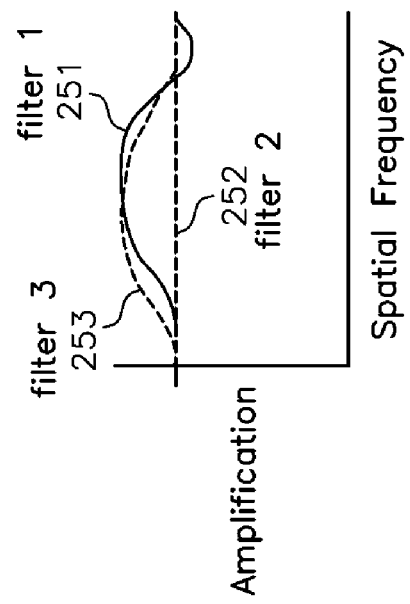
FIG. 11D illustrates an example of filter construction as a function of spatial frequency and amplification.

Referring now to FIG. 11D an example of filter construction as a function of spatial frequency and amplification is illustrated. Once a spectral power curve has been determined for each position along the optical axis, a corresponding filter can be constructed for each axial position. Here a filter 1 is represented by curve 251, a filter 2 is represented by flat curve 252, and a filter 3 is represented by dashed curve 253. A filter is chosen so that lower-contrast spatial frequencies are amplified, thus making power spectra from different axial positions more similar to one another. As will be understood by those skilled in the art having the benefit of this disclosure, in constructing these filters, it is also necessary to avoid amplifying spatial frequencies that have poor signal-to-noise ratios, so as to avoid amplifying noise.

Referring now to FIG. 11E, an example of a power spectrum including the attenuation of power of higher spatial frequencies due to the lower signal-to-noise ratio at the higher spatial frequencies is illustrated. Spectral power curve 239E illustrates an example of an ideal curve that each of the acquired power spectra 239A through 239D (as shown in FIG. 11B) should follow after correction, under the assumption that noise is negligible. Curve 239F illustrates an example of a power spectrum that the power spectra 239A through 239D might follow after correction, including the attenuation of power of higher spatial frequencies due to the lower signal-to-noise ratio at the higher spatial frequencies. Myriad approaches may be used for balancing the need for signal amplification with the need to avoid amplifying noise.

Referring now to FIG. 11C, an example of a set of sectioned pseudo-projection data obtained for a selected cell is shown. A pseudo-projection data set 240 comprises a plurality of image stacks, $S_1 \ldots S_N$, in this example represented by stacks 244, 245, 246, from differing perspective views. Each image stack 244, 245, 246 comprises three ranges 241, 242, 243. The pseudo-projection data set 240 is filtered using filter 251, filter 252, and filter 253 to produce filtered pseudo-projection data sets from range 1 241, range 2 242, and range 3 243, respectively. The reconstruction of each of these filtered ranges 241, 242, and 243 takes the form of a truncated backprojection, in which the truncation of each section corresponds to the known limits of each sectional pseudo-projection's focal-plane scan range. This truncation is indicated by the regions within the reconstruction zones shown by the rectangles 260 in FIG. 11C. Thus a voxel is only included in the calculation of a specific pseudo-projection if that voxel corresponds to a location in 3D space that was included in the volume of scanned during the acquisition of the pseudo-projection. The central filtered pseudo-projection data set is reconstructed to form a first volume of reconstruction 264 and the outer filtered pseudo-projection data sets are reconstructed to form two additional second volume of reconstruction 262 and 283. A summed reconstruction 270 comprises a sum of reconstructed images from the three volumes of reconstruction 262, 284, and 263.

Note that while, in the examples, only three pseudo-projections are illustrated, a greater number may be advantageously employed. An odd number of sections may be advantageously used. A variety of spatial frequency filters with different cutoff frequencies may be advantageously employed on pseudo-projection data sets where a given pseudo-projection is divided into more than three sections.

In an alternate example embodiment of the sectional pseudo-projection method, the three ranges are added together in a weighted sum, and the backprojection extends throughout the volume of reconstruction rather than being truncated. The weighting applied to the three ranges may be based on weighting each range with a power-spectrum filter, as described above, or in a simple linear fashion such that the ranges with poorer resolution and/or contrast contribute less weight at a set of spatial frequencies. Doing so lessens the amount of contamination in the weighted sum by poor-quality images. In this example embodiment, it is no longer necessary to know the precise limits of each range, and only a single reconstruction process, rather than three, is necessary.

Filter Optimization

Figure 12:
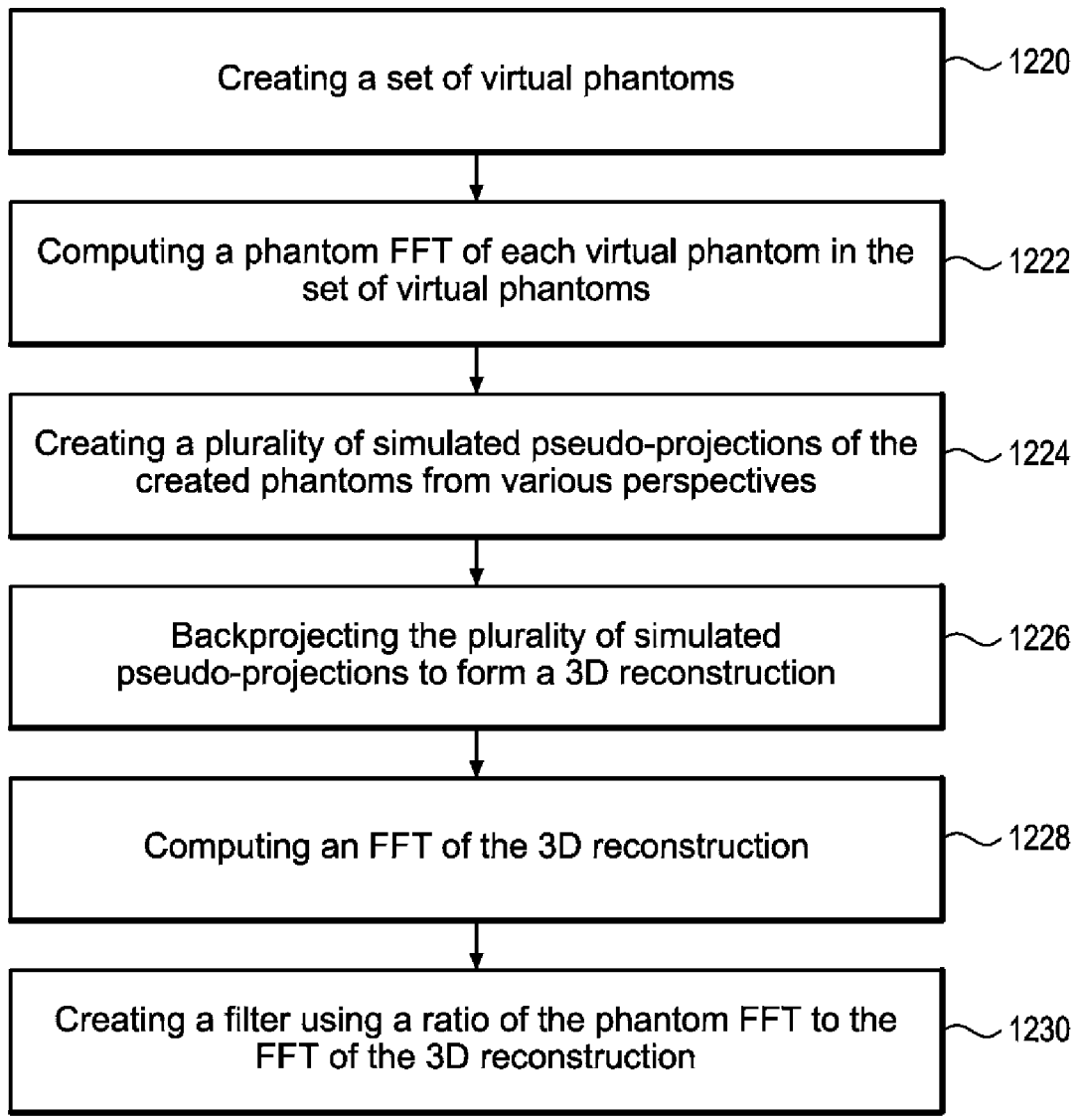
FIG. 12 schematically shows a block diagram of a method for creating statistical filters using virtual phantoms.

Referring now to FIG. 12, there schematically shown is a block diagram of a method for creating statistical filters using virtual phantoms. Block 1220 indicates creating a set of virtual phantoms, in one example the set of virtual phantoms may advantageously include virtual phantoms with nuclei having differing sizes and shapes and with differing numbers and placement of nucleoli. An FFT of each virtual phantom is computed at block 1222. A plurality of simulated pseudo-projections of each virtual phantom is generated from various perspectives at block 1224. The plurality of simulated pseudo-projections (sim. PP) are then backprojected to form the first part of a 3D reconstruction at block 1226. The FFT of the 3D reconstructions are then computed at block 1228. A filter (F1-FN) that optimizes the backprojection is then created at block 1230 using a ratio of the virtual phantom FFT (FFT_P1-FFT_PN) to the FFT of the 3D reconstruction expressed by the set of backprojections (FFT_BP1-FFT_BPN). Data resulting from this simulation may be represented in tabular form as shown in Table 1.

TABLE 1

| Phantom | FFT(P) | BackProj. using sim. PP | FFT | Filter |
|---------|--------|-------------------------|-----|--------|
| P1 | FFT_P1 | BP1 | FFT_BP1 | F1 |
| P2 | FFT_P2 | BP2 | FFT_BP2 | F2 |
| . | . | . | . | . |
| . | . | . | . | . |
| . | . | . | . | . |
| PN | FFT_PN | BPN | FFT_BPN | FN |

Statistical metrics, as, for example, the filter median (F1, F2, . . . , FN), the filter mean or other statistical metrics, are particularly useful for accommodating different phantoms.

The invention has been described herein in considerable detail in order to comply with the Patent Statutes and to provide those skilled in the art with the information needed to apply the novel principles of the invention, and to construct and use such exemplary and specialized components as are required. However, it is to be understood that the invention may be carried out by specifically different equipment, and devices, and that various modifications, both as to the equipment details and operating procedures, may be accomplished without departing from the true spirit and scope of the present invention.

What is claimed is:

1. A method for reconstructing three-dimensional (3D) tomographic images comprising:
   acquiring a set of pseudo-projection images of at least one object;
   applying error corrections to the set of pseudo-projection images to produce a set of corrected pseudo-projection images, where the error corrections correct for registration error effects by measuring a center of mass of the at least one object in each projection image, and by correcting for axial registration errors by shifting the at least one object in each pseudo-projection image so that the axial component of the center of mass for the object is aligned to a common axial position in each of the set of corrected pseudo-projection images; and
   processing the set of corrected pseudo-projection images to produce (3D) tomographic images.

2. The method of claim 1 wherein applying error corrections also comprises correcting for at least one of illumination error effects and extinction coefficient effects.

3. The method of claim 1 wherein applying error corrections also comprises correcting for centering errors by shifting the object in the set of pseudo-projection images so that a vertical component of the center of mass is aligned to the centerline of the image.

4. The method of claim 1 wherein the set of pseudo-projection images include at least one pair of pseudo-projection images at opposing viewing angles and wherein applying error corrections further comprises:
   applying a shift to a first member of the at least one pair of pseudo-projection images, relative to a second member of the at least one pair of pseudo-projection images;
   combining the first and second members of the at least one pair of pseudo-projection images; and
   measuring the combined shifted pseudo-projection images to determine whether at least a selected one of errors including centering errors and axial registration errors are a minimum.

5. The method of claim 1 wherein each of the set of pseudo-projection images is acquired from an illuminated region along an optical axis and includes a plurality of pixels, each pixel having a grey scale value, wherein applying error corrections comprises altering each grey scale value mapped to an illumination gradient representing a change of grey scale values for locations along the optical axis.

6. The method of claim 5 in which the illuminated region includes illuminated fluorophores.

7. The method of claim 5 in which the illuminated region includes saturated fluorophores.

8. The method of claim 5 wherein grey scale values in each of the set of pseudo-projection images are modified by weighting them according to the formula $$\Omega((T)=[1-gR\sin(T)]^{-1}$$

so that the intensity for pixel coordinates X and Y, J(X, Y; T), used for post-acquisition processing of a pseudo-projection is given by $$J(X,Y;T)=I(X,Y,T)\Omega(T),$$

where
g is the illumination gradient;
T is the rotation angle of the tube;
I(X,Y,T) is the intensity captured by the optical system for a pseudo-projection acquired at angle T, for pixel coordinates X and Y in a blank region of the field of view;
Z is the distance along the optical axis from the center of the scan range to the center of the tube; and
R is maximum distance from the center of the tube to the center of the scan range over the course of the angular rotation of the tube.

9. The method of claim 1 wherein each of the set of pseudo-projection images has a corrected illumination level estimated from a priori knowledge and wherein applying error corrections comprises applying the a priori knowledge of the position of the optical elements during acquisition of each of the set of pseudo-projection images.

10. The method of claim 1 wherein each of the set of pseudo-projection images has a corrected illumination level estimated from information contained within each of the set of pseudo-projection images.

11. The method of claim 1 wherein acquiring a set of pseudo-projection images of an object comprises:
    dividing a projection scan of the object into a plurality of sectional pseudo-projections acquired at a plurality of perspective viewing angles; and
    summing the plurality of sectional pseudo-projections at each of the plurality of perspective viewing angles to form the set of pseudo-projections.

12. The method of claim 11 wherein the plurality of sectional pseudo-projections are weighted.

13. The method of claim 11 wherein the object comprises a biological cell.

14. The method of claim 11 wherein the plurality of sectional pseudo-projections includes at least two outer sections and a middle section, the method further comprising weighting the at least two outer sections with a lower value weight than the middle section.

15. The method of claim 1 where acquiring a set of pseudo-projection images comprises dividing a projection scan of an object into a plurality of sectional pseudo-projections acquired at a plurality of perspective viewing angles.

16. The method of claim 15 wherein processing comprises backprojecting each of the plurality of sectional pseudo-projections in a volume of reconstruction for forming a 3D reconstruction of the object.

17. The method of claim 15 wherein the sectional pseudo-projections are weighted.

18. The method of claim 15 wherein the object comprises a biological cell.

19. The method of claim 15 wherein the plurality of sectional pseudo-projections includes at least two outer sections and a middle section, the method further comprising weighting the at least two outer sections at a lower value than the middle section.

20. The method of claim 1 where acquiring a set of pseudo-projection images comprises:
    scanning an objective lens through the object in an objective scan direction;
    measuring in-plane spatial frequency power spectra as a function of the location of the focal plane relative to the center of the object; and
    sectioning the scanned pseudo-projection.

21. The method of claim 20 wherein the object comprises a biological cell.

22. The method of claim 20 wherein measuring in-plane spatial frequency power spectra comprises:
(a) imaging the object by scanning a focal plane to find a peak focus score;
(b) acquiring an image stack through the entire object relative to a center, where the center is defined as a peak focus score;
(c) calculating an in-plane spatial frequency power spectrum of each image in the stack;
(d) repeating steps (a) through (d) for a plurality of objects; and
(e) calculating in-plane spatial frequency power spectra for the plurality of objects to determine an average in-plane spatial frequency power spectrum for each location relative to the center.

23. The method of claim 1 where acquiring a set of pseudo-projection images comprises building a set of sectioned pseudo-projections from a plurality of sectioned scanned pseudo-projections acquired at different perspective views.

24. The method of claim 23 further comprising:
filtering the set of sectioned pseudo-projections, using a plurality of filters computed by comparing off-center power spectra relative to the center power spectrum, to generate a plurality of filtered pseudo-projection data sets;
passing each filtered pseudo-projection data set to a plurality of volumes of reconstruction; and
summing the plurality of volumes of reconstruction to form a summed volume of reconstruction.

25. The method of claim 1 where processing the set of corrected pseudo-projection images to produce (3D) tomographic images comprises:
calculating logarithmic values for the set of corrected pseudo-projection images; and
applying backprojection to the logarithmic values to create a 3D tomographic reconstruction.

26. The method of claim 25 wherein applying backprojection includes applying a filtering operation to the logarithmic values of the at least one projection image.

27. The method of claim 1 wherein processing comprises weighting each pseudo-projection in the reconstructed tomographic image in inverse proportion to its departure from a baseline illumination level; and reconstructing the set of weighted pseudo-projections through backprojection and filtering of the images to create a reconstructed tomographic image.

28. A method for reducing registration errors in a projection image comprising:
a) acquiring at least a pair of projection images, wherein the at least a pair of projection images are extended depth of field images;
a) measuring the center of mass of at least one object of interest in each projection image;
b) correcting for axial registration errors by shifting each projection image so that the axial component of the center of mass in each projection image is aligned to a common axial position; and
c) correcting for centering errors by shifting each projection image so that the vertical component of the center of mass in each projection image is aligned to the centerline of the image.

29. The method of claim 28 wherein the at least a pair of projection images are pseudo-projections.

30. A method for reducing registration errors in a projection image comprising:
(a) acquiring at least one pair of projection images at opposing viewing angles, wherein the at least one pair of projection images are extended depth of field images;
(b) applying a shift to a member of the at least one pair of projection images at opposing viewing angles, relative to the other member;
(c) combining the shifted member and the other member to produce combined shifted projection images;
(d) measuring the combined shifted projection images to determine if registration errors are a minimum for at least one of registration errors including centering errors and axial registration errors; and
(e) repeating steps (b) through (d) until step (d) is true.

31. The method of claim 30 wherein the at least one pair of projection images are pseudo-projections.

32. The method of claim 30 wherein the registration errors of the combined shifted projection images are measured by an entropy measure.

33. The method of claim 30 wherein combining the two members of the at least one pair of projection images comprises applying filtered backprojection to the pair of projection images.

34. The method of claim 30 wherein combining comprises averaging the shifted member and the other member.

35. The method of claim 30 wherein combining comprises subtracting one of the members of the pair of projection images from the other.

36. A method for reducing reconstruction errors due to the illumination variation in a series of pseudo-projection images comprising:
(a) lighting an object in an illumination region to produce a series of pseudo-projection images at varying positions along an optical axis; and
(b) altering each pseudo-projection image's grey scale value proportionate to an illumination gradient representing a change of grey scale values for locations along the optical axis, wherein each of the series of pseudo-projection images has a corrected illumination level estimated from a priori knowledge and knowledge of the position of the optical elements during acquisition of the pseudo-projection image.

37. The method of claim 36 wherein the corrected illumination level is further estimated from information contained within the pseudo-projection image.

38. The method of claim 36 wherein grey scale values in each of the series of pseudo-projection images are modified by weighting them according to the formula $$\Omega(T) = [1 - gR \sin(T)]^{-1}$$

so that the intensity for pixel coordinates X and Y, J(X, Y; T), used for post-acquisition processing of the pseudo-projection is given by $$J(X, Y; T) = I(X, Y, T)\Omega(T),$$

where
g is the illumination gradient;
T is the rotation angle of the tube;
I(X,Y,T) is the intensity captured by the optical system for the pseudo-projection acquired at angle T, for pixel coordinates X and Y in a blank region of the field of view;
Z is the distance along the optical axis from the center of the scan range to the center of the tube; and
R is maximum distance from the center of the tube to the center of the scan range over the course of the angular rotation of the tube.

39. The method of claim 36 in which the illuminated region includes illuminated fluorophores.

40. The method of claim 36 in which the illuminated region includes saturated fluorophores.

41. A method for generating 3D images from an optical tomography system, where the optical tomography system includes an optical axis comprising:
dividing a full projection scan of an object into a plurality of sectional pseudo-projections acquired at a plurality of perspective viewing angles, where the sectional pseudo-projections are divided into sections located along the optical axis and wherein each of the plurality of sectional pseudo-projections includes at least two outer sections and a middle section, the method further comprising weighting the at least two outer sections at a lower value than the middle section;
summing the plurality of sectional pseudo-projections at each of the plurality of perspective viewing angles to form a set of full pseudo-projections; and
backprojecting the set of full pseudo-projections in a volume of reconstruction to form a 3D reconstruction of the object.

42. The method of claim 41 wherein the object comprises a biological cell.

43. A method for generating 3D images from an optical tomography system comprising:
dividing a full projection scan of an object into a plurality of sectional pseudo-projections acquired at a plurality of perspective viewing angles, where the sectional pseudo-projections are divided into sections located along the optical axis, wherein the plurality of sectional pseudo-projections includes at least two outer sections and a middle section, the method further comprising weighting the at least two outer sections at a lower value than the middle section; and
backprojecting the plurality of sectional pseudo-projections in a volume of reconstruction for forming a 3D reconstruction of the object.

44. The method of claim 43 wherein the sectional pseudo-projections are weighted according to their position along the optical axis in the reconstructed tomographic image.

45. The method of claim 43 wherein backprojecting comprises applying filtered backprojection.

46. The method of claim 43 wherein the step of applying filtered backprojection produces at least one backprojected value that varies with its location along the optical axis.

47. The method of claim 43 wherein the object comprises a biological cell.

48. A method for scanning an object moving in an axial direction transverse to an objective scanning direction comprising:
scanning an objective lens through the object in the objective scan direction;
measuring in-plane spatial frequency power spectra as a function of the location of the focal plane relative to the center of the object, wherein measuring in-plane spatial frequency power spectra comprises:
(a) imaging the object by scanning a focal plane to find a peak focus score;
(b) acquiring an image stack through the object relative to a center, where the center is defined as a peak focus score;
(c) calculating an in-plane spatial frequency power spectrum of each image in the stack;
(d) repeating steps (a) through (d) for a plurality objects;
(e) calculating in-plane spatial frequency power spectra for the plurality of objects to determine an average in-plane spatial frequency power spectrum for each location relative to the center; and
sectioning the scanned pseudo-projection.

49. The method of claim 48 wherein the object comprises a biological cell.

50. The method of claim 48 further comprising:
building a set of sectioned pseudo-projections from a plurality of sectioned scanned pseudo-projections acquired at different perspective views;
filtering the set of sectioned pseudo-projections, using a plurality of filters computed by comparing off-center power spectra relative to the center power spectrum, to generate a plurality of filtered pseudo-projection data sets;
passing each filtered pseudo-projection data set to a plurality of volumes of reconstruction; and
summing the plurality of volumes of reconstruction to form a summed volume of reconstruction.

51. A method for generating a statistical filter for reconstruction of images for 3D reconstructions, the method comprising:
creating a set of virtual phantoms;
computing a phantom FFT of each phantom in the set of virtual phantoms to produce a set of phantom FFTs;
creating a plurality of simulated pseudo-projections of the set of virtual phantoms from various perspectives;
backprojecting the plurality of simulated pseudo-projections to form a 3D reconstruction;
computing an FFT of the 3D reconstruction; and
creating a filter using a ratio of a subset of the set of phantom FFTs to the FFT of the 3D reconstruction expressed by the set of backprojections.

52. The method of claim 51 wherein the set of virtual phantoms comprises a set of nucleoli phantoms having differing sizes and shapes, with differing numbers and placement of nucleoli.

53. The method of claim 52 wherein the created filter comprises at least one statistical metric.

54. A method of 3D reconstruction comprising:
computing backprojection values within a sub-volume of the volume of reconstruction where 3D spatial coordinates and dimensions of the sub-volume are computed by determination of bounding box parameters for two orthogonal views of the reconstruction volume, wherein determination of bounding box parameters comprises:
analyzing a first pseudo-projection (PP) at 0° by finding the edges of the region of interest to determine a bounding box from a first perspective;
finding a set of coordinates $X_0$, $Z_0$ in PP space;
finding a set of coordinates $X_r$, $Z_r$ in reconstruction space;
analyzing PP@90° by finding the edges of the region of interest to determine a bounding box from a second perspective;
finding a set of coordinates $X_{90}$, $Z_{90}$ in PP space;
finding a set of coordinates $Y_r$ in reconstruction space; and
reconstructing volume using a set of coordinates [$X_r$, $Y_r$, $Z_r$].

55. The method of claim 54 wherein the bounding box bounded by parameters $X_r$ (min), $X_r$ (max), $Y_r$ (min), $Y_r$ (max), and $Z_r$ (max), $Z_r$ (min), where slices in the reconstruction space have a number equal to $Z_r$ (max)–$Z_r$ (min)+1.

56. The method of claim 54 in which the sub-volume comprises a solid 3D rectangle.

57. The method of claim 54 in which the sub-volume comprises a partially hollow 3D rectangle.

* * * * *